(12) United States Patent
Sasaki et al.

(10) Patent No.: US 7,131,186 B2
(45) Date of Patent: *Nov. 7, 2006

(54) METHOD OF MANUFACTURING COMBINATION TYPE THIN FILM MAGNETIC HEAD

(75) Inventors: Yoshitaka Sasaki, Sunnyvale, CA (US); Takehiro Kamigama, Hong Kong (CN)

(73) Assignees: Headway Technologies, Inc., Milpitas, CA (US); Sae Magnetics (H.K.), Ltd., Hong Kong (CN)

( * ) Notice: Subject to any disclaimer, the term of this patent is extended or adjusted under 35 U.S.C. 154(b) by 182 days.

This patent is subject to a terminal disclaimer.

(21) Appl. No.: 10/862,371

(22) Filed: Jun. 8, 2004

(65) Prior Publication Data

US 2004/0261254 A1 Dec. 30, 2004

Related U.S. Application Data

(62) Division of application No. 10/068,877, filed on Feb. 11, 2002, now Pat. No. 6,762,911.

(51) Int. Cl.
*G11B 5/127* (2006.01)
*H04R 31/00* (2006.01)

(52) U.S. Cl. .............................. 29/603.15; 29/603.13; 29/603.14; 29/603.16; 29/603.18; 205/199; 205/122; 216/62; 216/65; 216/66; 360/126; 360/317; 427/127; 427/128; 451/5; 451/41

(58) Field of Classification Search ............ 29/603.08, 29/603.13–603.16, 603.18; 205/199, 122; 360/126, 317; 427/127, 128; 451/5, 41; 216/62, 65, 66

See application file for complete search history.

(56) References Cited

U.S. PATENT DOCUMENTS

| | | | | |
|---|---|---|---|---|
| 5,805,391 A | 9/1998 | Chang et al. | ............... | 360/317 |
| 5,872,693 A | 2/1999 | Yoda et al. | ................. | 360/126 |
| 6,172,848 B1 | 1/2001 | Santini | ....................... | 360/126 |
| 6,188,544 B1 | 2/2001 | Mino | ......................... | 360/126 |
| 6,304,415 B1 | 10/2001 | Tateyama et al. | ........... | 360/126 |
| 6,317,289 B1 | 11/2001 | Sasaki | ....................... | 360/126 |
| 6,317,290 B1 | 11/2001 | Wang et al. | ................ | 360/126 |
| 6,353,511 B1 | 3/2002 | Shi et al. | .................... | 360/126 |
| 6,466,402 B1 | 10/2002 | Crue et al. | .................. | 360/126 |
| 6,614,620 B1 | 9/2003 | Tagawa et al. | ............. | 360/126 |
| 6,657,816 B1 | 12/2003 | Barr et al. | .................. | 360/126 |
| 6,697,219 B1 | 2/2004 | Sato | .......................... | 360/126 |
| 6,801,407 B1 * | 10/2004 | Sasaki et al. | ............... | 360/317 |

FOREIGN PATENT DOCUMENTS

JP 11283218 A * 10/1999

* cited by examiner

*Primary Examiner*—Paul D. Kim
(74) *Attorney, Agent, or Firm*—Oliff & Berridge, PLC

(57) ABSTRACT

On a surface of a bottom pole, a write gap film and first magnetic material film having a high saturation magnetic flux density are formed, and the first magnetic material film is etched to remain a portion extending from an air bearing surface to a throat height zero reference position and a first non-magnetic film is formed in a removed portion. The first non-magnetic material film is polished to obtain a flat surface which is coplanar with a surface of the first magnetic material film. A second magnetic material film having a high saturation magnetic flux density is formed on the flat surface. The second magnetic material film, first magnetic material film, write gap film and bottom pole are partially removed by RIE using a mask formed on the flat surface.

22 Claims, 33 Drawing Sheets

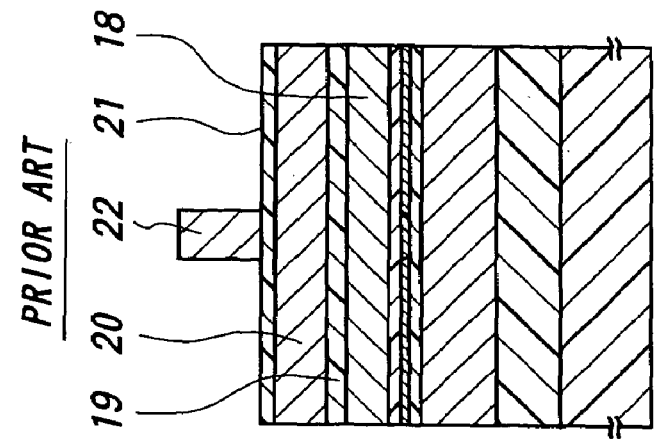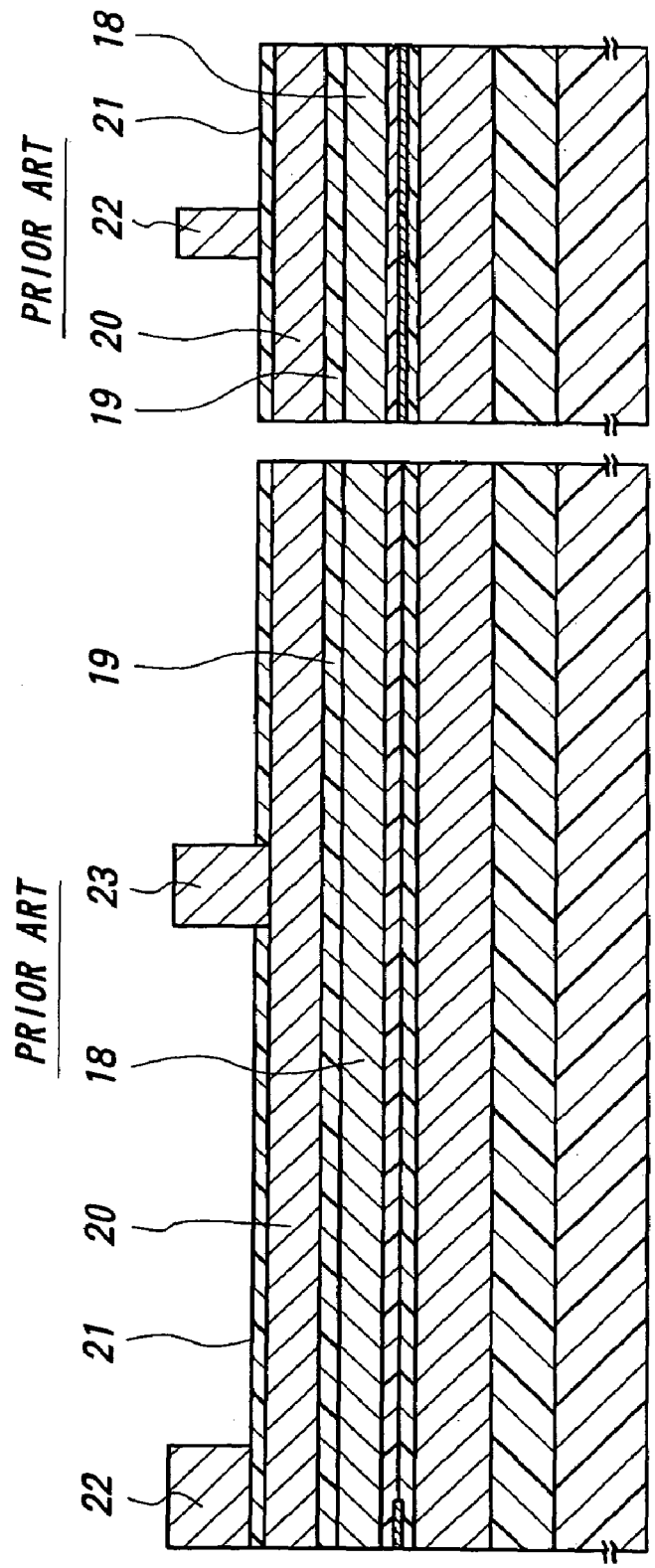

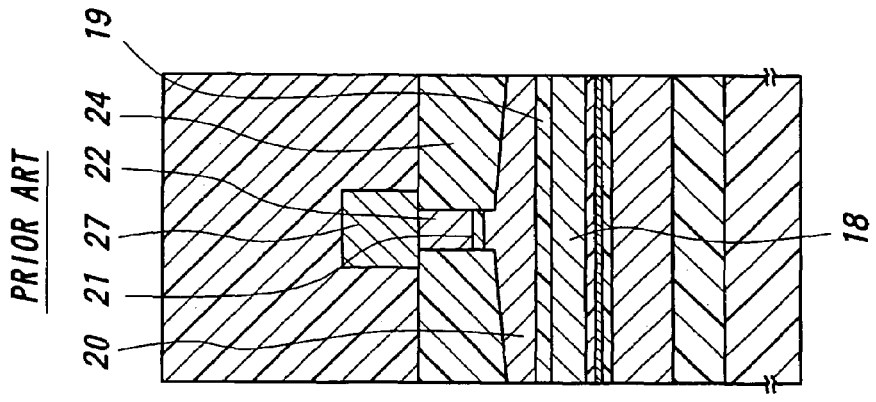
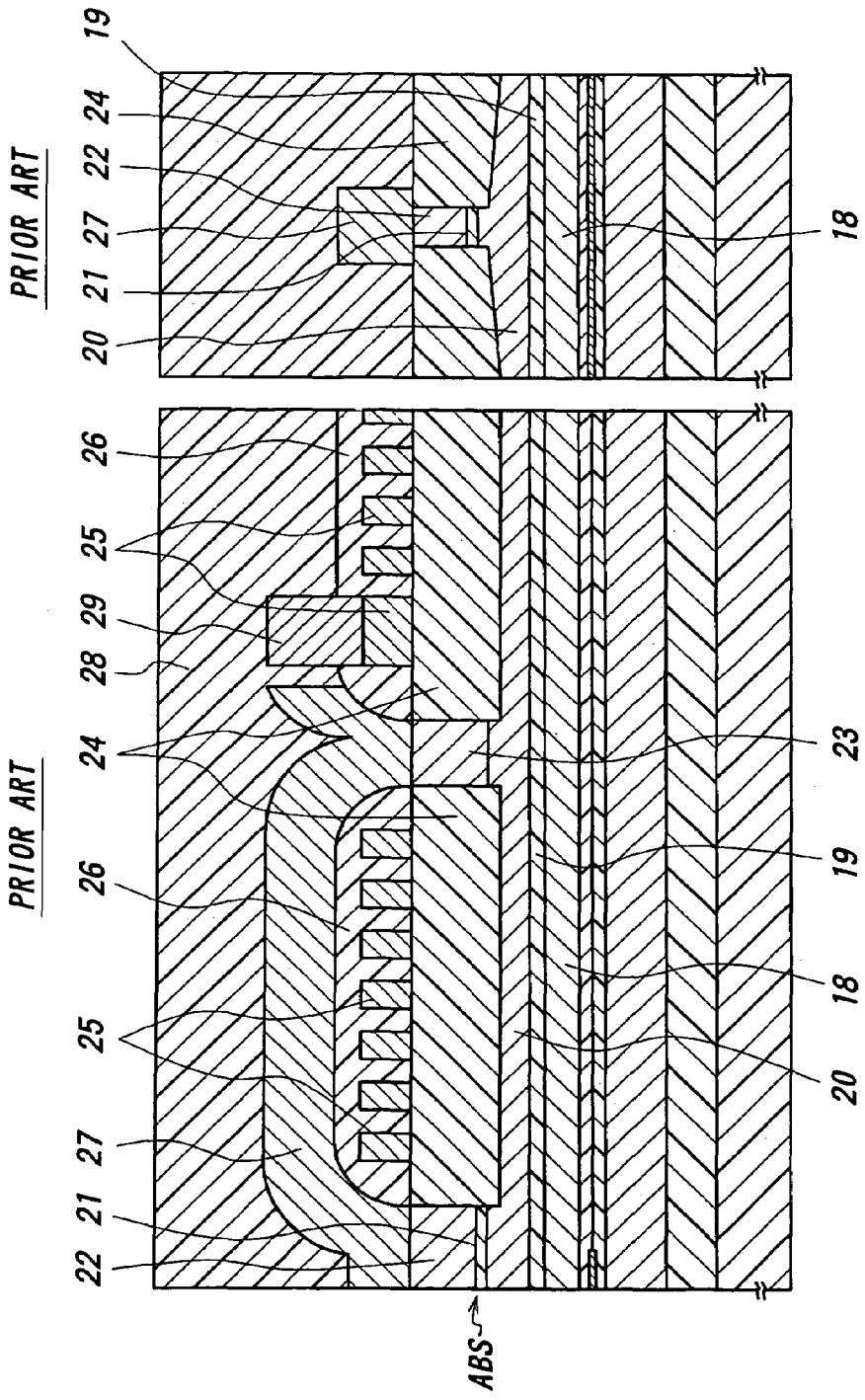
FIG. 5B
PRIOR ART
FIG. 5A
PRIOR ART

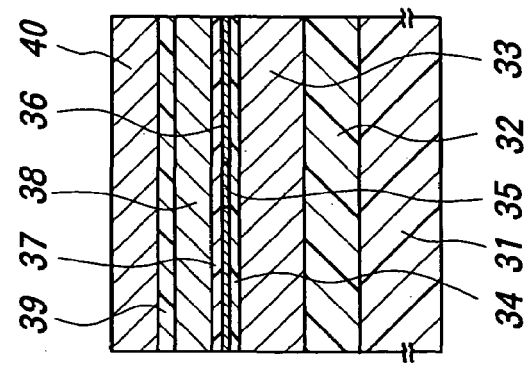
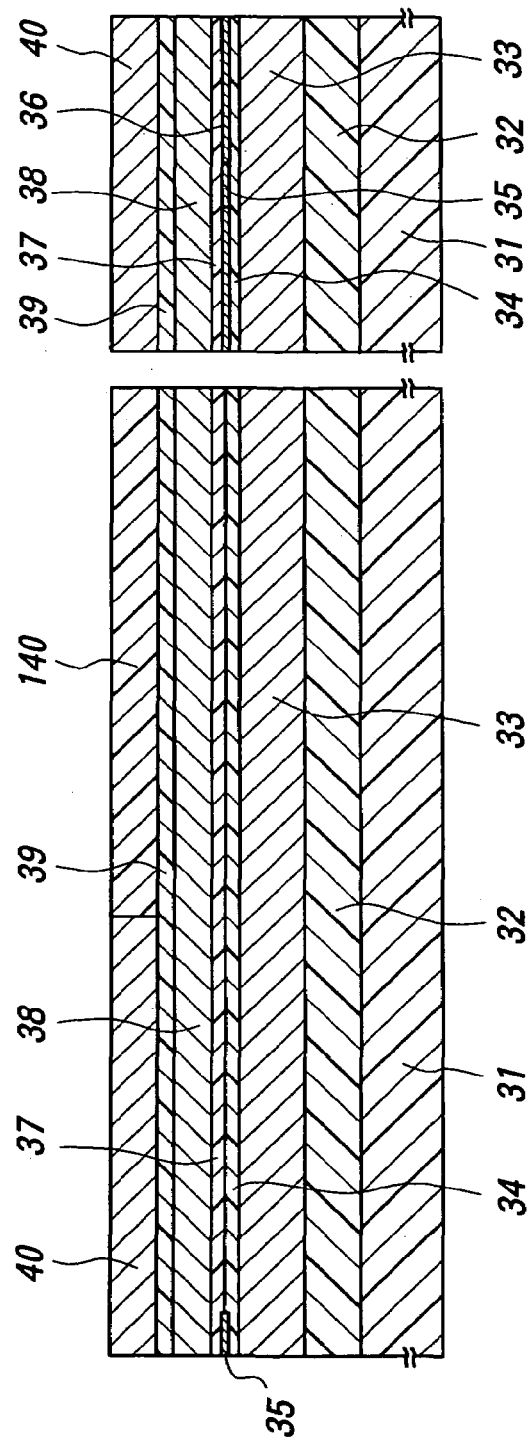

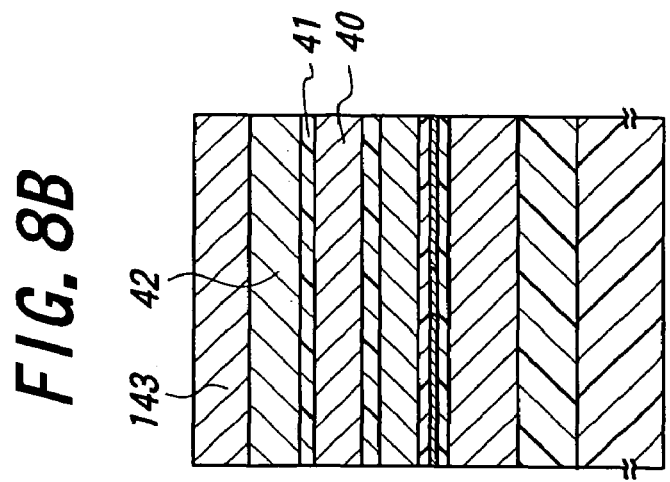

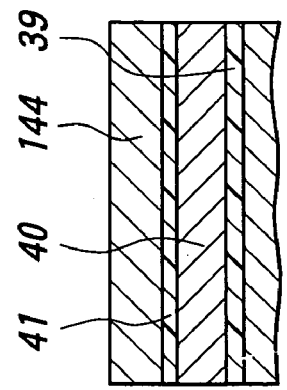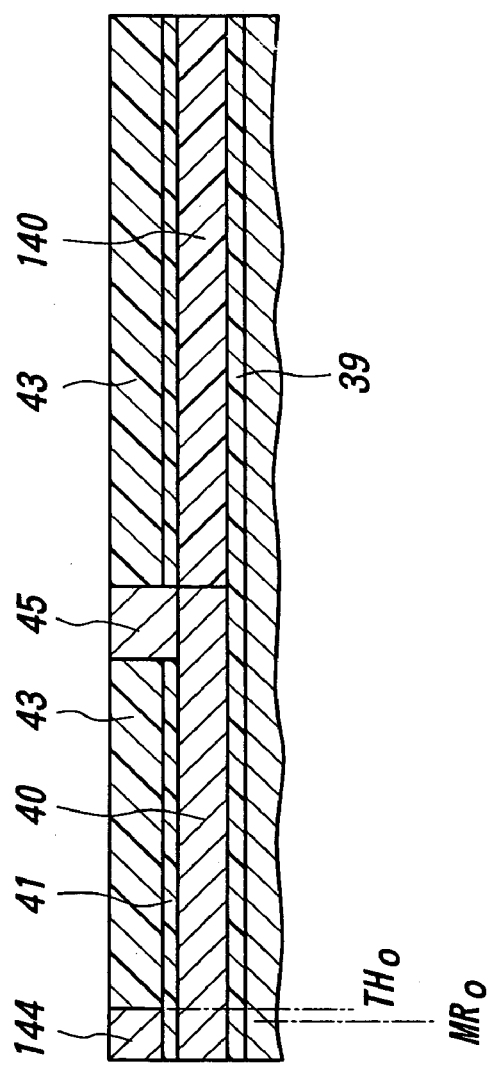

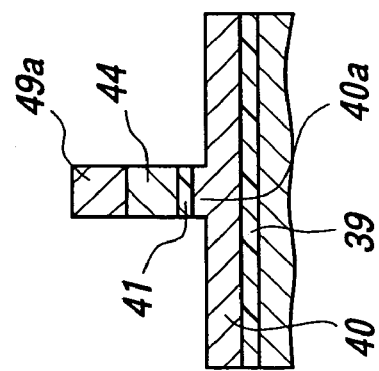
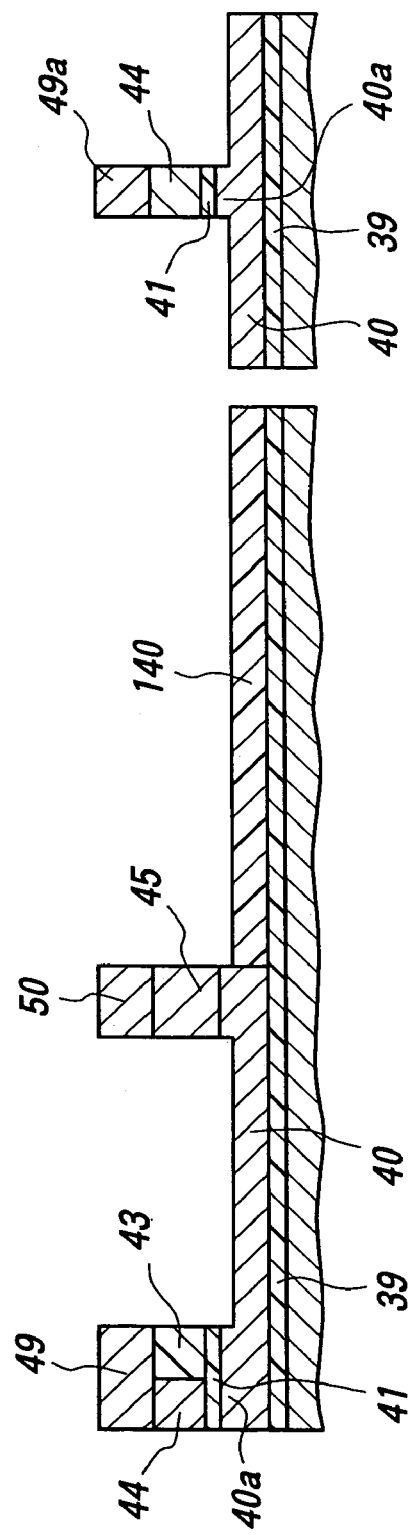

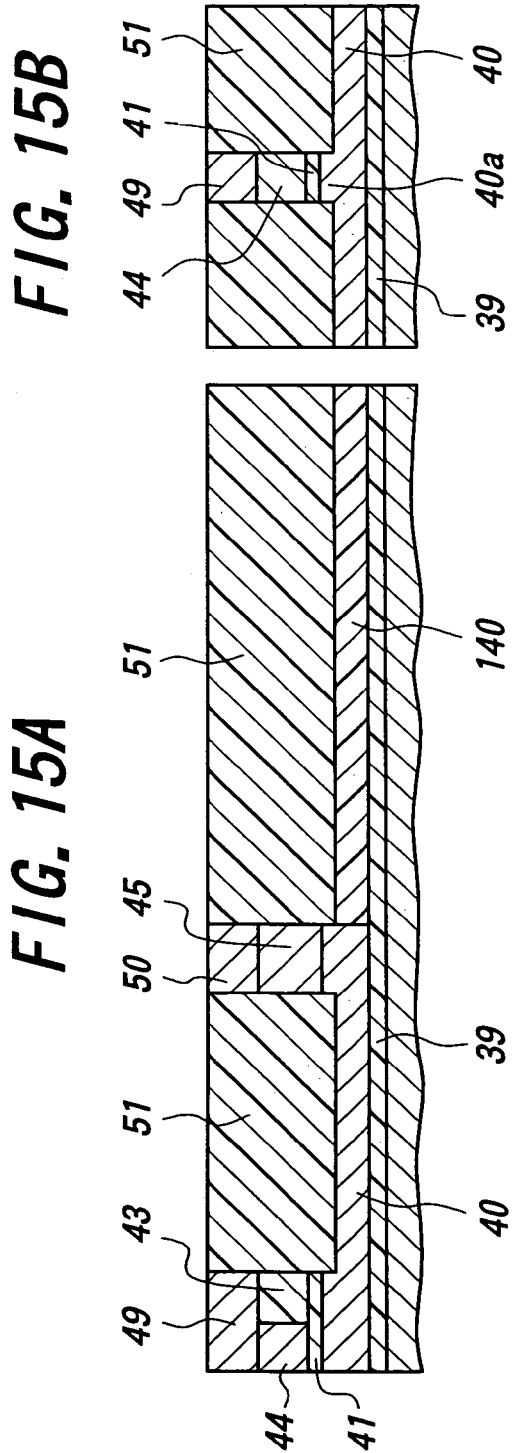

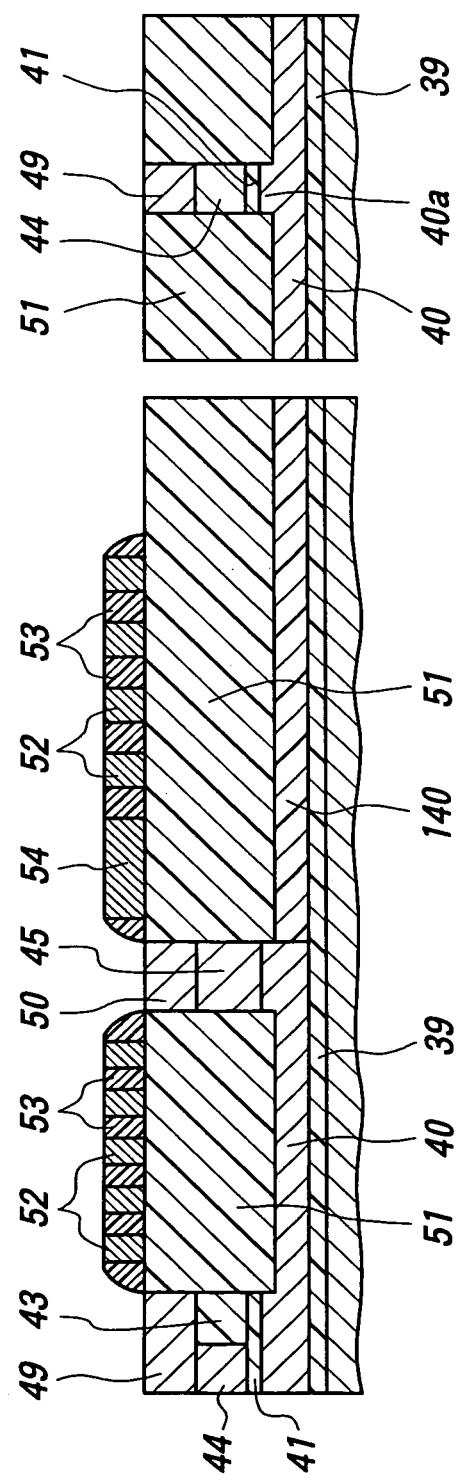

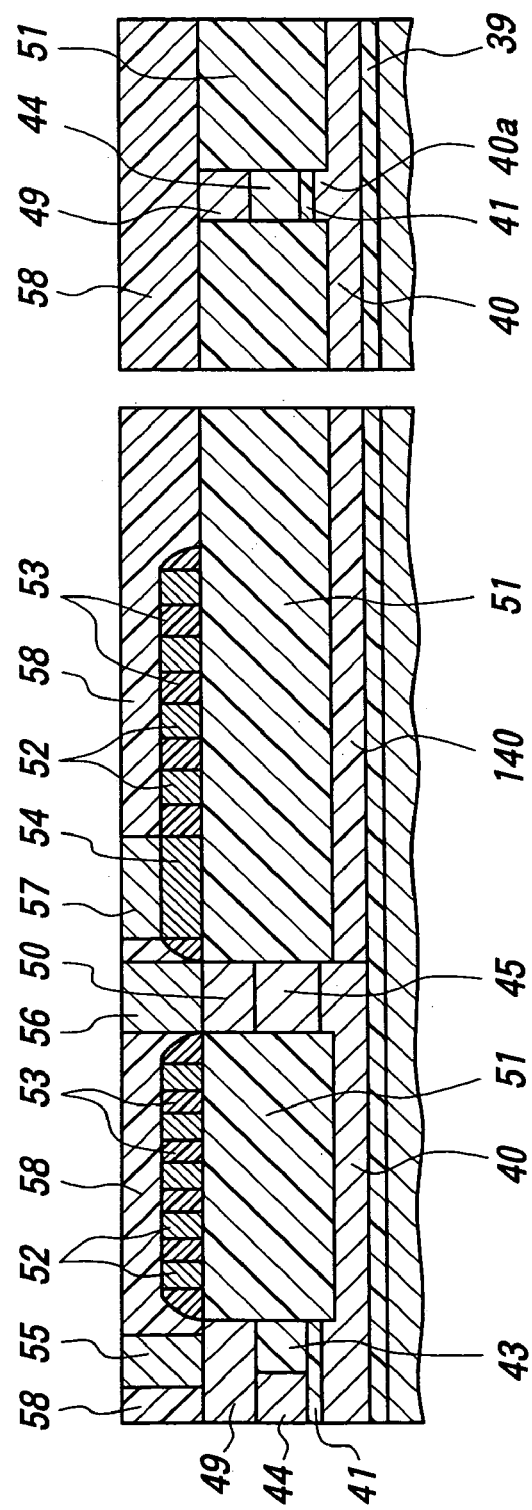

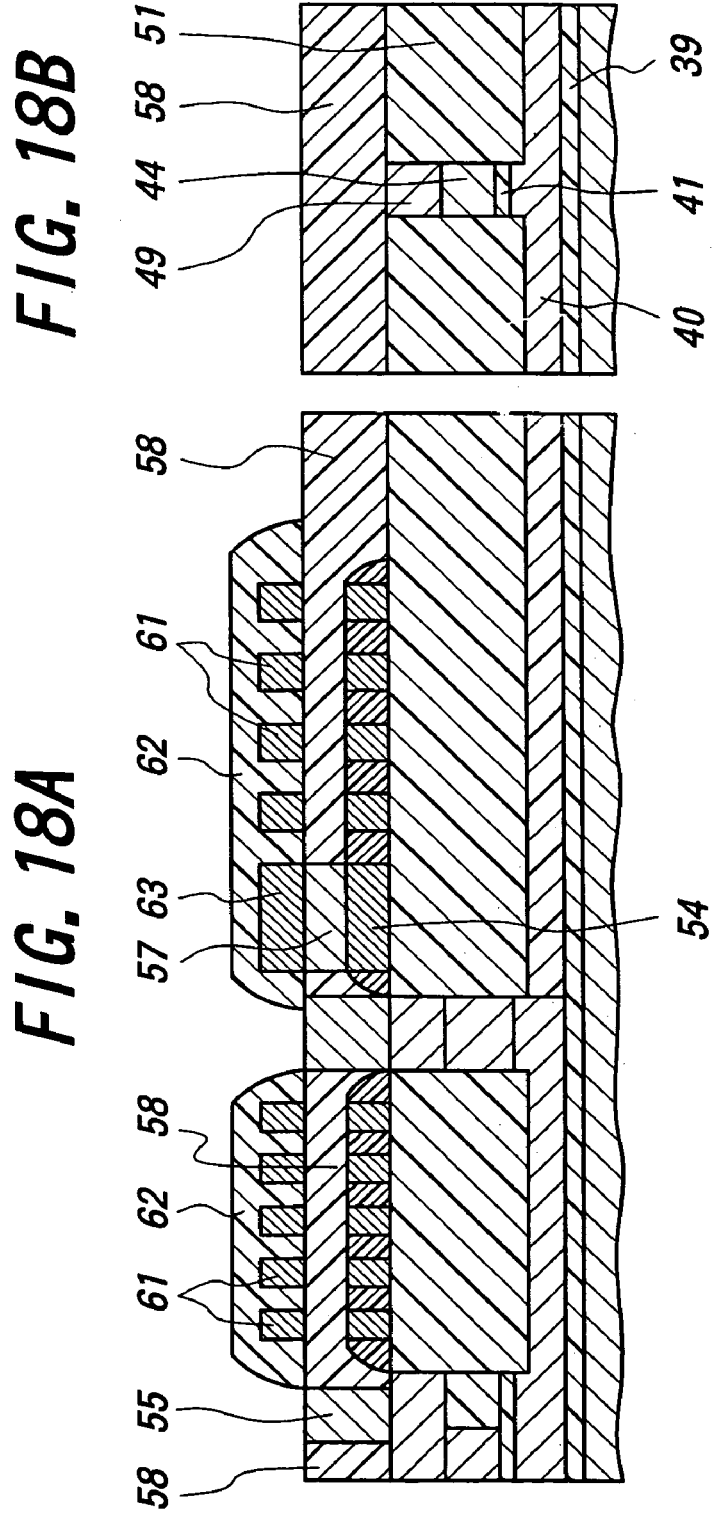

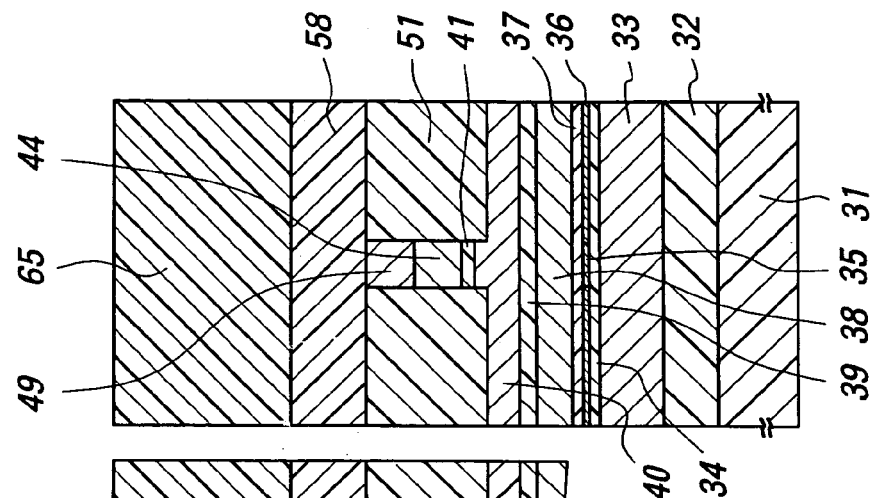
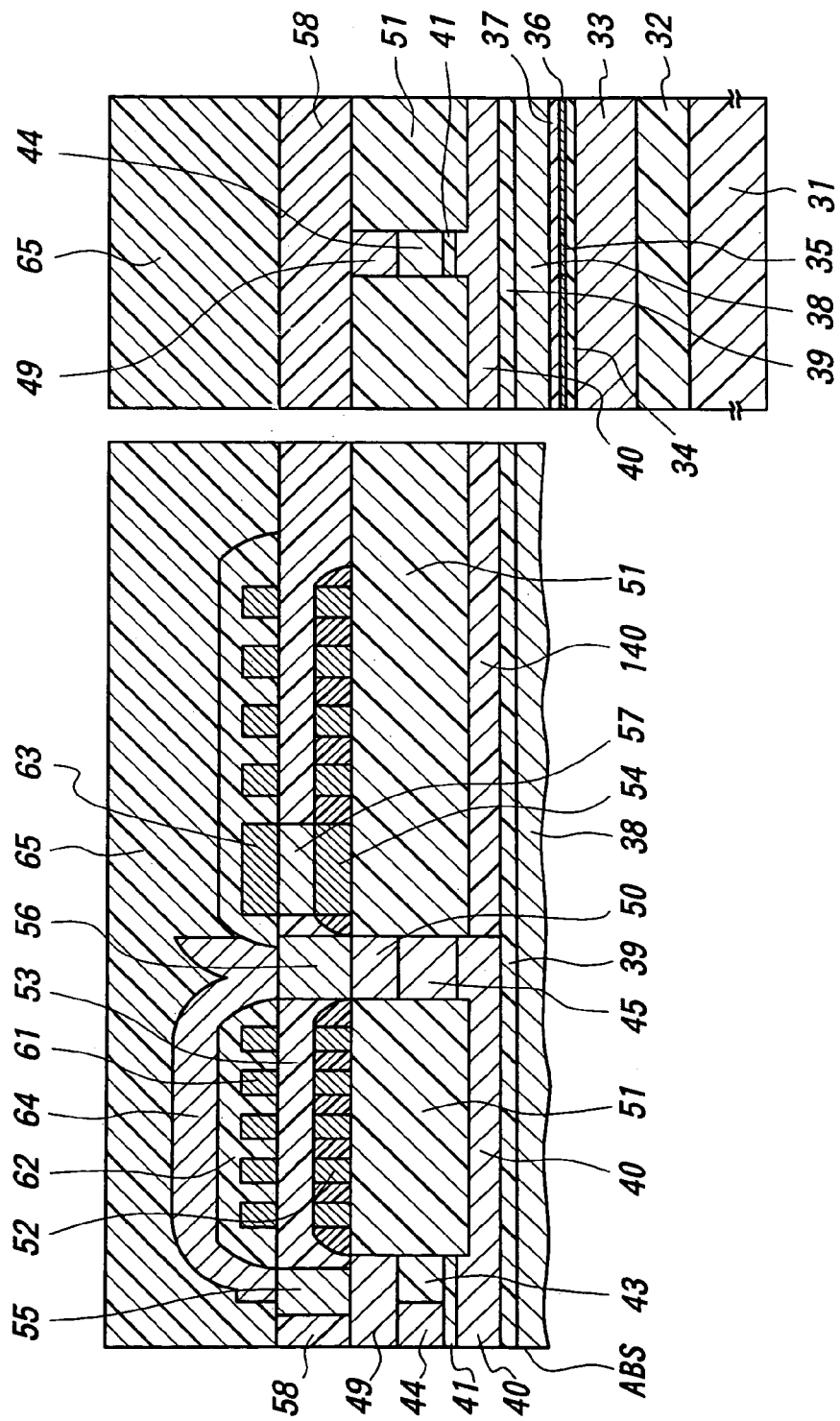

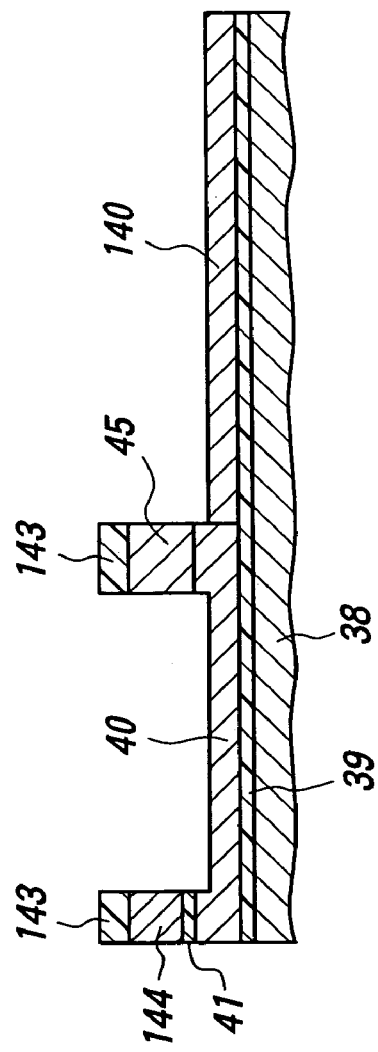

METHOD OF MANUFACTURING COMBINATION TYPE THIN FILM MAGNETIC HEAD

This is a Divisional of application Ser. No. 10/068,877 filed Feb. 11, 2002 now U.S. Pat. No. 6,762,911. The entire disclosure of the prior application is hereby incorporated by reference herein in its entirety.

BACKGROUND OF THE INVENTION

1. Field of the Invention

The present invention relates to a combination type thin film magnetic head having an inductive type thin film magnetic head element serving as a writing magnetic converting element and a magnetoresistive type thin film magnetic head element serving as a reading magnetic converting element stacked one on the other, and a method of manufacturing the same. More particularly, the present invention relates to an inductive type writing thin film magnetic head having a narrow record track for attaining a high surface recording density on a magnetic record medium by utilizing magnetic materials having a high saturation magnetic flux density, and a method of manufacturing the same.

2. Description of the Related Art

Recently a surface recording density of a hard disc device has been improved, and it has been required to develop a thin film magnetic head having an improved performance accordingly. A recent magnetoresistive type thin film magnetic head using a GMR (Giant Magneto-Resistive) element has a surface recording density up to 100 gigabits/inch$^2$. A combination type thin film magnetic head is constructed by stacking an inductive type thin film magnetic head intended for writing information on a magnetic record medium and a magnetoresistive type thin film magnetic head intended for reading information out of the magnetic record medium on a substrate. As a reading magnetoresistive element, a GMR element having a magnetoresistive change larger than a normal anisotropic MR element by 5–15 times has been used. In order to improve a performance of the GMR element, there have been various proposals.

In a normal anisotropic MR element, a single film of a magnetic material showing the magnetoresistive effect is utilized. Many GMR elements have a multi-layer structure having a stack of a plurality of films. There are several mechanisms for generating a resistance change in the GMR element, and the multi-layer structure is dependent upon a mechanism. For instance, a super-lattice GMR film and a glanular film have a simple structure and a large resistance change under a weak magnetic field. A spin-valve GMR film will be suitable for a large scale manufacture.

As stated above, a desired high surface recording density can be simply attained by changing the AMR element by the GMR element as long as the reproducing thin film magnetic head is concerned, and a surface recording density could be further increased by utilizing a magnetic material having a higher magnetoresistive sensitivity. A performance of a reproducing head element is also dependent upon a pattern width in addition to the above mentioned selection of material. The pattern width includes a MR height and track width. A track width is determined by a photolithography process and a MR height is determined by an amount of polishing for forming an air bearing surface (ABS).

At the same time, the performance of the recording magnetic head is also required to be improved in accordance with the improvement of the performance of the reproducing magnetic head. In order to increase a surface recording density, it is necessary to realize a high track density on a magnetic record medium. To this end, a pole portion of the recording thin film magnetic head element has to be narrowed in a sub-micron order by utilizing the semiconductor manufacturing process. However, upon decreasing a track width by utilizing the semiconductor manufacturing process, there is a problem that a sufficiently large magnetic flux could not be obtained due to a miniaturized structure of the pole portion. In order to solve such a problem, there has been proposed to make at least a pole portion of a recording head element of a magnetic material having a high saturation flux density (Hi-Bs material).

FIGS. 1–5 show successive steps of a method of manufacturing a conventional combination type thin film magnetic head. In these drawings, A represents a cross sectional view cut along a plane perpendicular to the air bearing surface ABS and B denotes a cross sectional view of a pole portion cut along a plane parallel to the air bearing surface ABS. FIG. 6 is a plan view showing schematically the structure of the known combination type thin film magnetic head.

As shown in FIG. 1, an alumina ($Al_2O_3$) insulating film 12 having a thickness of about 2–3 μm is deposited on a substance 11 made of AlTiC. Next, a bottom shield film 13 made of a magnetic material for magnetically shielding a GMR reading head element from an external magnetic field. On the bottom shield film 13, a shield gap film 14 made of alumina is formed with a thickness of 300–350 Å by sputtering. Then, a GMR film 15 having a given layer-structure is formed, and lead electrodes 16 for the GMR film are formed by a lift-off process. Next, a top shield gap film 17 made of alumina is formed with a thickness of 300–350 Å by sputtering, and a magnetic film 18 serving as a top shield film is formed with a thickness of about 3 μm.

Next, an isolation film 19 made of alumina is formed with a thickness of about 0.3 μm for isolating the reading GMR head element from a writing induction type thin film magnetic head element to suppress noise in a reproduced output from the GMR head element. After that, a bottom pole 20 of the recording head element made of permalloy is formed with a thickness of 1.5–2.0 μm as illustrated in FIG. 1. It should be noted that in the drawings a ratio of thickness of various portions does not exactly correspond to an actual ratio. For instance, the isolation film 19 is shown to have a smaller thickness.

Next, as depicted in FIG. 2, on the bottom pole 20, is formed a write gap film 21 having a thickness of about 2000 Å, and a top pole 22 made of permalloy which is a magnetic material having a high saturation magnetic flux density is formed in accordance with a given pattern. At the same time, a bridge film 23 for magnetically coupling the bottom pole 20 with the top pole 22 at a back-gap is formed. The top pole 22 and bridge film 23 are formed by plating with a thickness of about 3–4 μm.

Then, in order to avoid a widening of an effective track width, i.e. in order to prevent a magnetic flux from extending at the bottom pole 20 during a writing operation, the write gap film 21 and the underlying bottom pole 20 around the top pole 22 are etched by ion milling to form a so-called trim structure. After that, forming an alumina insulating film 24 having a thickness of about 3 μm over a whole surface, a surface is flattened by the chemical mechanical polishing (CMP) as shown in FIG. 3.

Next, as illustrated in FIG. 4, a thin film coil 25 is formed on the flattened surface by the electrolytic plating of Cu in accordance with a given pattern, and an insulating film 26 which supports the thin film coil 25 in an electrically insolated manner is formed by photoresist. Next, as depicted in FIG. 5, a top pole 28 made of permalloy is formed with a thickness of about 3 μm such that the top pole 22 and bridge film 23 are coupled with each other by the top pole 28. Next, a whole surface is covered with an overcoat film 29 made of alumina. It should be noted that during the formation of the top pole 28, an electrically conductive film 29 for connecting the thin film coil 25 to an external circuit is formed with a same magnetic material as that of the top pole 28. Finally, an end surface into which the GMR film 15, write gap film 21, top pole 22 and so on are exposed is polished to form an air bearing surface ABS to complete a slider.

FIG. 6 shows a cross sectional view and a plan view illustrating the structure of the known combination type thin film magnetic head manufactured in the manner explained above. The bottom pole 20 has a large area, but the top poles 22 and 28 have a smaller area than the bottom pole. One of factors determining the performance of the writing head element is a throat height TH. The throat height TH is a distance from the air bearing surface ABS to an edge of the insulating film 26 which isolates the thin film coil 25 in an electrically insulating manner, and this distance is desired to be short. One of factors determining the performance of the reading head element is an MR height MRH. This MR height (MRH) is a distance from the air bearing surface ABS into which one edge of the GMR film 15 is exposed to the other edge of the GMR film. During the manufacturing process, a desired MR height MRH is obtained by controlling an amount of polishing the air bearing surface ABS.

There is another factor determining the performance of the thin film magnetic head together with the above mentioned throat height TH and MR height MRH. This factor is an apex angle θ, which is defined by an angle formed by a tangential line to a side wall of the insulating film 26 isolating the thin film coil 25 and an upper surface of the top pole 28. In order to miniaturize the thin film magnetic head, it is required to increase the apex angle θ as large as possible.

Now problems in the known combination type thin film magnetic head mentioned above will be explained. After forming the insulating film 26 such that the thin film coil 25 is supported by the insulating film in an electrically insulating manner, the top pole 28 is formed. In this case, the top pole 28 has to be formed into a given pattern along the side wall of the insulating film 26. To this end, a photoresist is formed with a thickness of 3–4 μm at a step of the insulating film 26 having a height of about 7–10 μm. Now it is assumed that at the side wall of the insulating film 26, the photoresist should have a thickness of at least 3 μm, a thickness of the photoresist at the bottom of the step would become thick such as 8–10 μm. Since a width of record track of the writing head is mainly determined by a width of the top pole 22, it is not necessary to miniaturize the top pole 28 compared with the top pole 22, but if the track width of submicron order such as 0.2 μm is desired, the pole portion of the top pole 28 should be miniaturized in the order of submicrons.

Upon forming the top pole 28 into a desired pattern by plating, the photoresist has to be deposited on the top pole 22 and insulating film 26 having the step of more than 10 μm such that the photoresist has a uniform thickness. Then, the photoresist is subjected to the exposure of light to form the top pole 28 having the pole portion of submicron order. That is to say, a pattern of submicron order should be formed with the photoresist having a thickness of 8–10 μm. When the pole portion 28 is formed by plating, a seed layer made of permalloy serving as an electrode is previously formed. During the light exposure of the photolithography, light is reflected by the permalloy seed layer, and a desired pattern might be deformed. Therefore, it is quite difficult to form the pattern of submicron order precisely.

In order to improve the surface recording density, it is required to miniaturize the pole portion as explained above. Then, the miniaturized pole portion must be made of a magnetic material having a high saturation magnetic flux density. IN general, FeN and FeCo have been known as magnetic materials having a high saturation magnetic flux density. However, these magnetic materials could not be easily formed by sputtering into a film having a given pattern. It has been known to shape the sputtered film into a given patter by the ion milling. However, etching rate is too slow and a track width of submicron order could not be controlled precisely.

NiFe, CoNiFe, FeCo have been known to have a high saturation magnetic flux density, and these magnetic materials could be formed into a given pattern by plating. For instance, Fe rich NiFe (more than 50%) has a saturation magnetic flux density of 1.5–1.6 tesla (T), and a composition could be controlled stably. However, in order to realize a surface recording density of 80–100 gigabits/inch$^2$, a track width has to be not larger than 0.2 μm. Then, there would be required to use a magnetic material having a higher saturation magnetic flux density. There has been proposed to form a magnetic film by plating using CoNiFe. However, this magnetic material could provide the magnetic faculty of about 1.8–2.0 T. In order to realize the surface recording density of about 80–100 gigabits/inch$^2$, it is desired to use a magnetic material having a high saturation magnetic flux density such as 2 T.

A high frequency performance of the induction type thin film magnetic head is also determined by a magnetic path length which is defined as a length from the throat height zero position to the back-gap. A high frequency performance of the thin film magnetic head is improved by shortening the above mentioned magnetic path length. It would be possible to shorten the magnetic path length by reducing a pitch of successive coil windings of the thin film coil 11, but this solution has a limitation. Then, there has been proposed to construct the thin film coil to have two coil layers. Upon forming the two-layer thin film coil, after forming a first thin film coil layer, an insulating film of photoresist is formed with a thickness of about 2 μm. This insulating layer has a round outer surface, and thus upon forming a second thin film coil layer, a seed layer for electrolytic plating has to be formed on an inclined portion. Therefore, upon etching the seed layer by the ion milling, a portion of the seed layer hidden by the inclined portion could not be removed sufficiently and coil windings might be short-circuited. Therefore, the second thin film coil has to be formed on a flat surface of the insulating layer.

For instance, it is now assumed that a thickness of the first thin film coil layer is 2–3 μm, a thickness of the insulating film formed on the first thin film coil layer is 2 μm, and an apex angle of the inclined portion of the insulating film is 45–55°, an outer surface of the second thin film coil layer must be separated from the throat height zero reference position by a distance of 6–8 μm which is twice of a distance from the throat height zero reference position to the outer surface of the first thin film coil layer. Then, a magnetic path length would be longer accordingly. When the thin film coil has space/line of 1.5 μm and a total number of coil windings is eleven, six coil windings are provided in the first thin film coil layer and five coil windings are formed in the second thin film coil layer. Then, a length of the whole thin film coil becomes 11.5 μm. In this manner, in the known thin film magnetic head, a magnetic path length could not be shortened, and a high frequency property could not be improved.

SUMMERY OF THE INVENTION

The present invention has for its object to provide a thin film magnetic head, in which the above mentioned various problems of the conventional combination type thin film magnetic head can be solved or mitigated, while a miniaturized pole portion of submicron order could be realized and the surface recording density can be improved with preventing the undesired side writing.

It is further object of the invention to provide a combination type thin film magnetic head having a shortened magnetic path length to improve a high frequency property.

It is another object of the invention to provide a method of manufacturing precisely a combination type thin film magnetic head having a miniaturize pole portion of submicron order.

It is still another object of the invention to provide a method of manufacturing a combination type thin film magnetic head with an improved high frequency property by shortening a magnetic path length.

According to the invention, a combination type thin film magnetic head comprises a substrate, an inductive type thin film magnetic head element and a magnetoresistive type thin film magnetic head element which are formed one on the other such that these magnetic head elements are supported by the substrate and air bearing surface is defined; wherein said inductive type thin film magnetic head element includes;

a first pole made of a magnetic material which extends inwardly from said air bearing surface;

a write gap film made of a non-magnetic material and formed on one surface of said first pole to extend inwardly from said air bearing surface over at least a distance of a pole chip;

a bottom track pole made of a magnetic material and formed on a surface of said write gap film opposite to a surface which is brought into contact with said first pole to extend inwardly from said air bearing surface over at longest said distance of the pole chip;

a first non-magnetic material film formed to extend inwardly over a given distance such that the first magnetic material film includes an outer end wall which defines a throat height zero reference position together with an inner end surface of the bottom track pole opposite to the air bearing surface and the first magnetic material film has a flat surface which is coplanar with a second surface of the bottom track pole opposite to a first surface which is brought into contact with said write gap film;

an top track pole formed on said flat coplanar surface of the bottom track pole and first non-magnetic material film to extend inwardly from said air bearing surface to at least the inner end surface of the first non-magnetic material film such that said top track pole includes a track chip portion which exposes to the air bearing surface and a contact portion having a width larger than the track chip portion;

a second non-magnetic material film formed such that aligned side walls of the bottom track pole, first non-magnetic material film and top track pole are surrounded by said second non-magnetic material film and the second non-magnetic material film has a flat coplanar surface together with a second surface of the top track pole opposite to a first surface which is brought into contact with the flat coplanar surface of the bottom track pole and first non-magnetic material film;

a thin film coil formed in an electrically isolated manner inwardly with respect to an end surface of the second non-magnetic material film which is brought into contact with the aligned end surfaces of the first non-magnetic material film and the contact portion of the top track pole; and a second pole made of a magnetic material such that the second pole has one end which is magnetically coupled with the contact portion of the top pole and the other end which is magnetically coupled with the first pole at a back-gap remote from the air bearing surface, said second pole surrounding a part of the thin film coil together with first pole.

In the combination type thin film magnetic head according to the invention, it is preferable that said bottom track pole and top track pole are formed by RIE (Reactive Ion Etching) in a self-aligned manner and a surface of said second non-magnetic material film opposite to said flat coplanar surface together with the top track pole is extended toward said first pole beyond said write gap film to construct a trim structure. Furthermore, said thin film coil is preferably formed on the flat coplanar surface of the top track pole and second non-magnetic material film. Moreover, said top track pole may be preferably made of FeN, FeCo, CoNiFe, FeAlN or FeZrN, and said bottom track pole may be preferably made of FeN, FeCo, CoNiFe, FeAlN, FeZeN or NiFe. In this case, CoNiFe, FeCo and NiFe may be formed as a plating film, and FeN, FeCo, FeAlN and FeZrN may be formed as a sputtering film.

According to the invention, a method of manufacturing a combination type thin film magnetic head including a substrate, an inductive type thin film magnetic head element and a magnetoresistive type thin film magnetic head element which are supported by the substrate to define an air bearing surface, wherein a process of forming said inductive type thin film magnetic head element comprises:

a step of forming a first pole made of a magnetic material;

a step of forming a write gap film made of a non-magnetic material on one surface of said first pole;

a step of forming a first magnetic material film on a surface of said write gap film;

a first etching step for removing said first magnetic material film such that a portion of the first magnetic material film extending from at least a position which will define an air bearing surface to a throat height zero reference position;

a step of forming a first non-magnetic material film such that the first non-magnetic material film is brought into contact with said first magnetic material film at said throat height zero reference position;

a step of polishing said first non-magnetic material film to form a flat surface which is coplanar with a surface of said first magnetic material film opposite to a surface which is brought into contact with said write gap film;

a step of forming, on said flat coplanar surfaces of the first magnetic material film and first non-magnetic material film, an top track pole made of a magnetic material such that the top track pole includes a track chip portion which extends inwardly from at least said position for defining the air bearing surface to at least an inner end surface of said first non-magnetic material film and a contact portion which continues from said track chip portion and has a wider width than said track chip portion;

a second etching step for selectively removing said first non-magnetic material film and first magnetic material film to form a bottom track pole by a reactive ion etching, while said top track pole is used as a mask;

a step of forming a second non-magnetic material film in an area which is removed by said second etching step;

a step of polishing said second non-magnetic material film to obtain a flat surface which is coplanar with the surface of said top track pole; a step of forming a thin film coil in an inner area with respect to adjoining end surfaces of the first and second non-magnetic material films such that the thin film coil is isolated electrically; and a step of forming a second pole made of a magnetic material such that one end of the second pole is magnetically coupled with said contact portion of the top track pole and the other end is magnetically coupled with said first pole at a back-gap remote from the air bearing surface.

In the method of manufacturing a combination type thin film magnetic head according to the invention, it is preferable that during said second etching step, after forming said bottom track pole, RIE is continued to remove selectively said write gap film and to remove said fist pole over a distance smaller than a thickness of the fist pole to form a trim structure. In this case, said step of forming the top track pole includes a step of forming a flat second magnetic material film on the flat coplanar surfaces of said first magnetic material film and first non-magnetic material film, a step of forming a mask having a given pattern corresponding to a shape of the top track pole to be formed on said second magnetic material film, and a step of selectively removing said second magnetic material film by the RIE using said mask, wherein the bottom track pole can be formed in a self-aligned manner by continuing the RIE to partially remove said first magnetic material film. Furthermore, it is preferable that said first magnetic material film is made of FeN or FeCo, said second magnetic material film is formed by plating of FeN or FeCo, and the RIE for selectively removing the first and second magnetic material films is performed at a high etching temperature above 50° C., particularly 200–300° C. under an atmosphere of $Cl_2$ or a mixed gas of $Cl_2$ and boron series gas such as $BCl_2$ or a mixed gas of $Cl_2$ and an inert gas such as Ar and $N_2$.

In the method of manufacturing a combination type thin film magnetic head according to the invention, it is preferable that said step of forming the top track pole includes a step of forming a flat second magnetic material film on the flat coplanar surfaces of said first magnetic material film and first non-magnetic material film, and a step of forming the top track pole by using a mask having a given pattern corresponding to a shape of the top track pole to be formed on said second magnetic material film, wherein said first magnetic material film is removed by the RIE using said mask to form the bottom track pole in a self-aligned manner. In this case, the etching may be carried out under the same condition as that mentioned above.

BRIEF DESCRIPTION OF THE DRAWINGS

FIGS. 1A, 1B–5A, 5B are cross sectional views showing successive steps of a known method of manufacturing a known combination type thin film magnetic head;

FIGS. 7A, 7B–11A, 11B are cross sectional views illustrating successive steps of the method of manufacturing a first embodiment of the combination type thin film magnetic head according to the invention;

FIGS. 13A and 13B are cross sectional views depicting a step next to that shown in FIGS. 11A and 11B;

FIGS. 15A–19B are cross sectional views illustrating successive steps of the method of manufacturing the combination type thin film magnetic head according to the invention;

FIGS. 31A, 31B–32A, 32B are cross sectional views showing successive steps of the method of manufacturing a seventh embodiment of the combination type thin film magnetic head according to the invention.

DESCRIPTION OF THE PREFERRED EMBODIMENTS

Figures 1A, 1B:
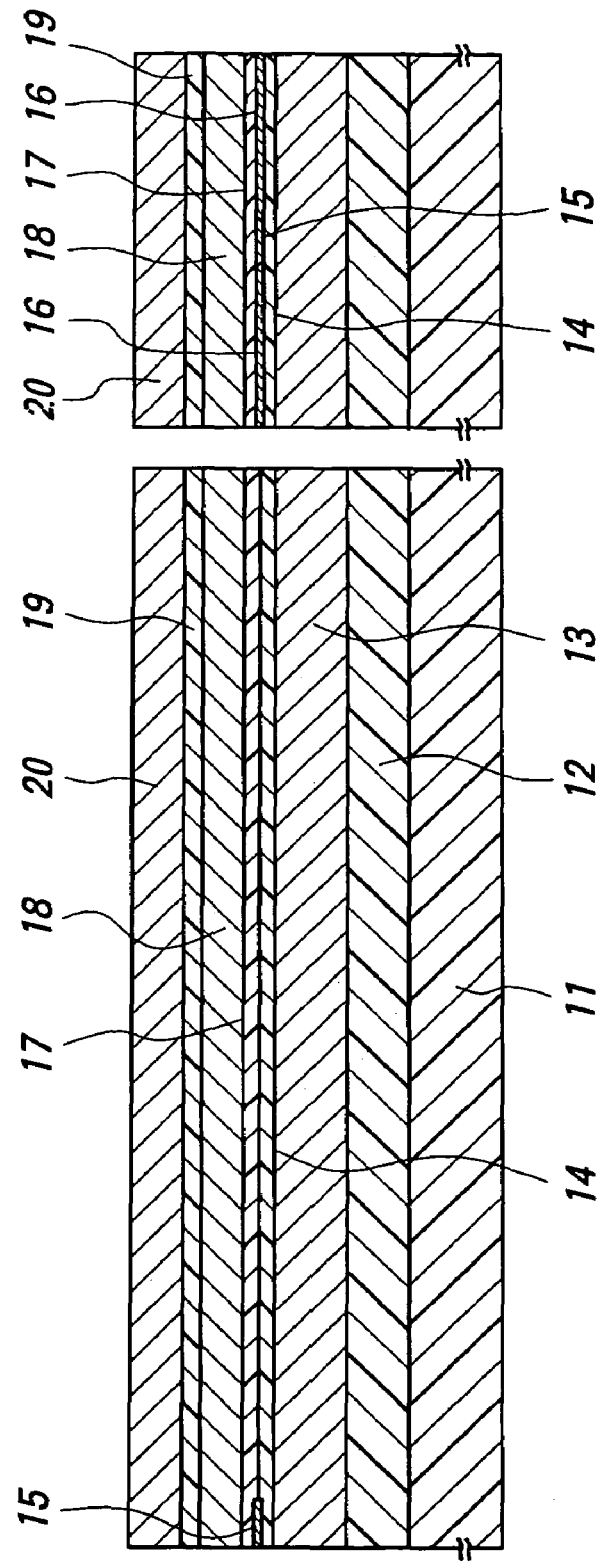
Figure 3B:
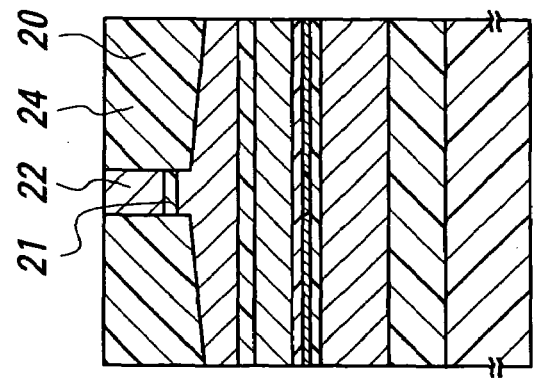
Figure 3A:
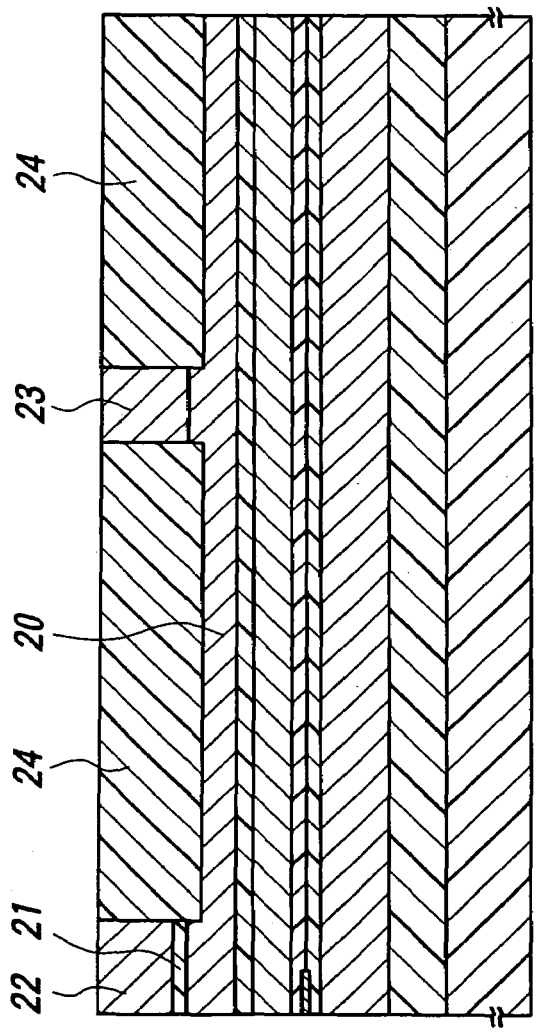
Figure 4B:
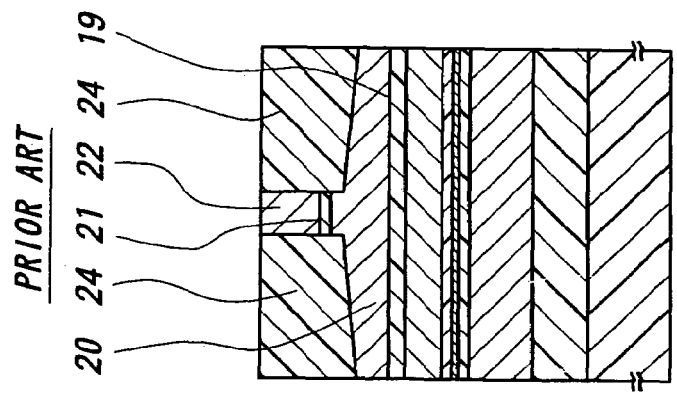
Figure 4A:
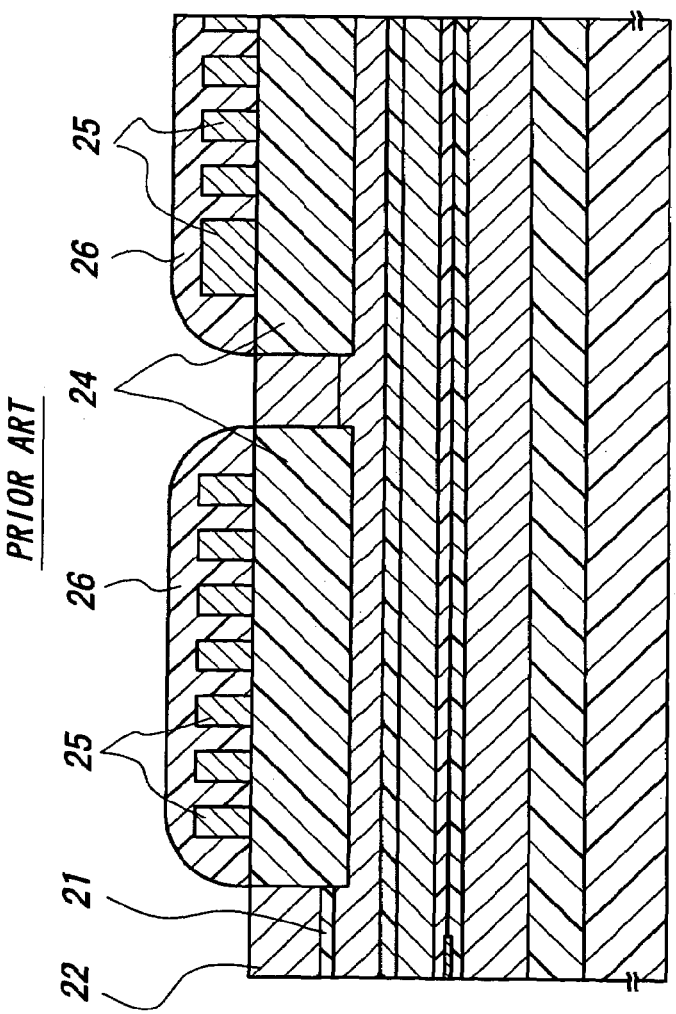
Figure 6:
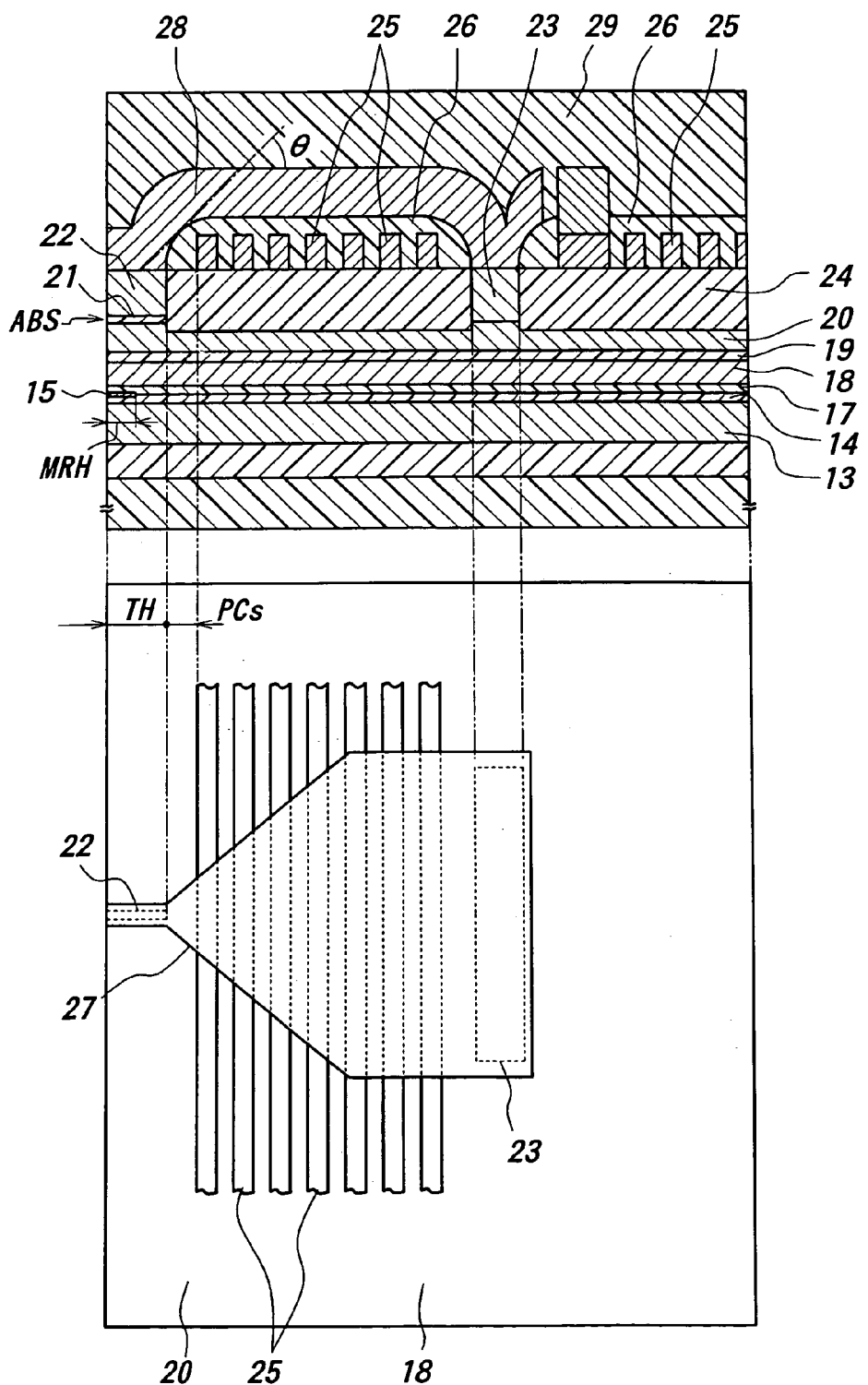
FIG. 6 shows cross sectional and plan views, illustrating the known combination type thin film magnetic head.

FIGS. 7–11 are cross sectional views showing successive steps of the method of manufacturing a first embodiment of the combination type thin film magnetic head according to the invention. It should be noted that the structure of a reading GMR head element formed by a magnetoresistive type thin film magnetic head and the method of manufacturing the same are substantially identical with those of the known head. As illustrated in FIG. 7A, an insulating film 32 made of alumina and having a thickness of about 3 μm is deposited on one surface of a substrate 31 made of AlTiC. Furthermore, a bottom shield film 33 made of permalloy for the magnetoresistive type thin film magnetic head is formed on the insulating film with a thickness of about 2–3 μm into a desired pattern by means of a plating method using a photoresist mask.

Subsequently, after forming an alumina film on the bottom shield film 33 with a thickness of 3–4 μm, a surface is flattened by CMP. Next, after forming a bottom shield gap film 34 made of alumina with a thickness of 300–350 Å by sputtering, a GMR film 35 having a given layer-structure and lead electrodes 36 for the GMR film are formed by a lift-off process. Then, a top shield gap film 37 is formed with a thickness of 300–350 Å by sputtering of alumina, and a top shield film 38 for the GMR head element is formed with a thickness of about 1–1.5 µm.

Next, an isolation film 39 made of alumina is formed with a thickness of about 0.15–0.2 µm for isolating the reading GMR head element from a writing inductive type thin film magnetic head element to suppress noise in a reproduced output from the GMR head element. After that, a bottom pole 40 of the recording head element made of permalloy is formed with a thickness of 2.0–2.5 µm. Next, the bottom pole 40 is formed into a given pattern by the reactive ion etching (RIE), and then an alumina insulating film 140 formed on a whole surface is polished by the chemical mechanical polishing (CMP) as shown in FIGS. 7A and 7B. The bottom pole 40 may be formed by a plating film of NiFe (80%:20%) or CoNiFe (64%:18%:18%) or may be formed by a sputtering film of FeAlN, FeN, FeCo or FeZrN. In the present embodiment, the bottom pole is formed by a sputtering film of FeN.

Next, a write gap film 41 made of a non-magnetic material is formed on the flattened surface with a thickness of 0.08–0.10 µm as shown in FIGS. 8A and 8B. After selectively removing a portion of the write gap film 41 situating at a back-gap, a magnetic material film 42 made of a magnetic material having a high saturation magnetic flux density is formed is formed by sputtering with a thickness of 0.5–0.8 µm. As will be explained later, the magnetic material film 42 constitutes a bottom track pole and is preferably made of FeN or FeCo having a high saturation magnetic flux density. In the present embodiment, the magnetic material film 42 is made of FeN. FeN has a saturation magnetic flux density of about 2.0 T, while FeCo has a saturation magnetic flux density of about 2.4 T.

Next, a mask 143 having a given pattern is formed on the magnetic material film 42 made of FeN. The mask 143 may be made of alumina, photoresist, metal and so on. In the present embodiment, the mask 143 is made of alumina. Then, RIE is performed at a high temperature of 50–300° C. under a mixture gas of $O_2$ or $N_2$ and a chlorine series gas such as $BCl_2$ and $Cl_2$ to remove the magnetic material film 42 selectively. This etching is carried out until the surface of the write gap film 41 is exposed. After that, an alumina insulating film 43 is formed with a thickness of about 1 µm, and the magnetic material film 42 and alumina insulating film 43 are polished by CMP to obtain a flat coplanar surface. A polishing amount of CMP is adjusted such that the magnetic material film 42 has a thickness of 0.3–0.6 µm. In this manner, a stripe-shaped magnetic material film 144 constituting a bottom track pole is formed as depicted in FIGS. 9A and 9B. In this case, an end surface of the alumina insulating film 43 adjoining to an inner end surface of the magnetic material film 144 situates near a MR height zero position $MR_0$ of the GMR film 35. Furthermore, during the formation of the magnetic material film 144 having a given pattern from the magnetic material film 42, a bottom bridge portion 45 constituting the back-gap is also formed from the magnetic material film 42.

Figure 10B:
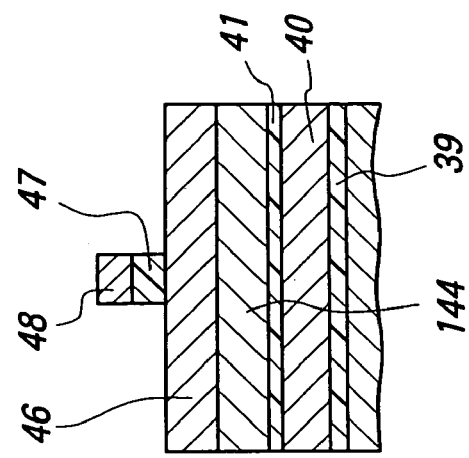
Figure 10A:
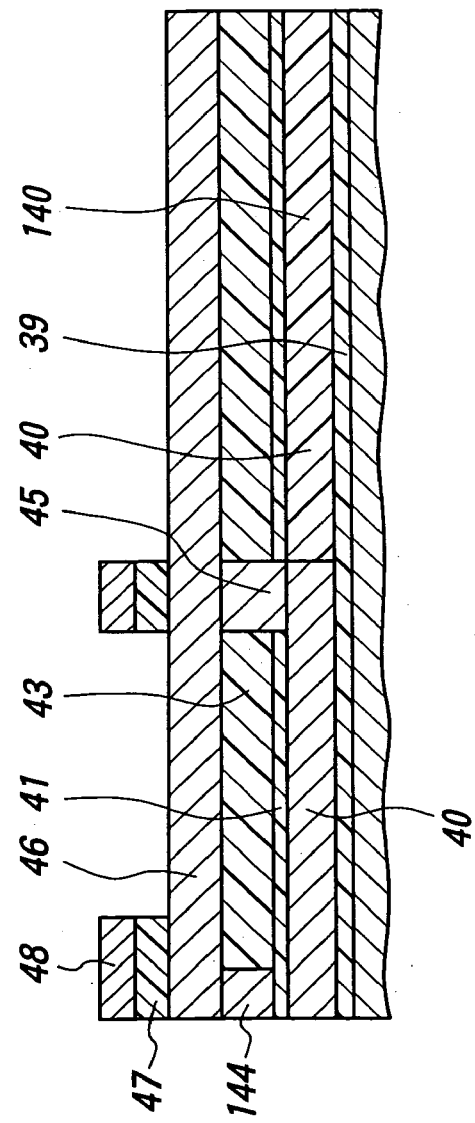

Next, as illustrated in FIGS. 10A and 10B, in order to constitute a top track pole, on the flat surface of the magnetic material film 144 and alumina insulating film 43, a magnetic material film 46 having a high saturation magnetic flux density is formed by sputtering with a thickness of 0.8–1.5 µm. It is preferable that the magnetic material film 46 is also made of a magnetic material having a high saturation magnetic flux density such as FeN and FeCo like as the magnetic material film 42. In the present embodiment, the magnetic material film 46 is made of FeN. After forming an alumina insulating film 47 having a thickness of 0.5–1.5 µm at positions at which the top track pole and back-gap are to be formed, a hard mask 48 made of NiFe is formed by photolithography. Upon forming the alumina insulating film 47 and hard mask 48, an alumina insulating film is formed on a whole surface and the hard mask 48 made of NiFe is selectively formed in accordance with a given pattern, and then the alumina insulating film is selectively etched using the hard mask 48 as an etching mask to form the alumina insulating film 47 having a given pattern.

Figure 11B:
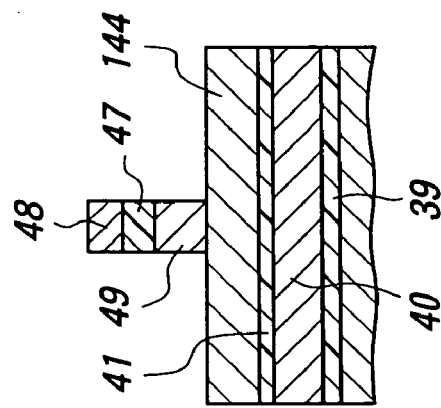
Figure 11A:
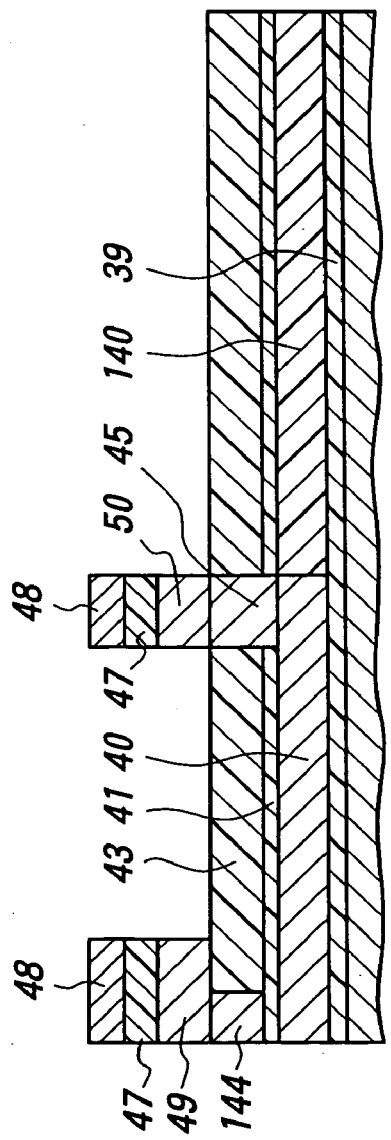
Figure 12A:
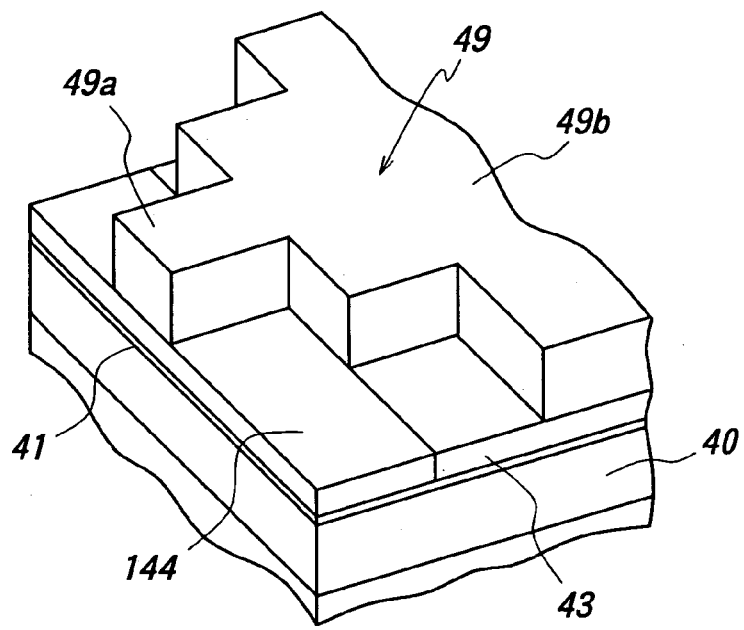
FIGS. 12A and 12B are perspective and plan views, respectively showing the structure after forming an top track pole.
Figure 12B:
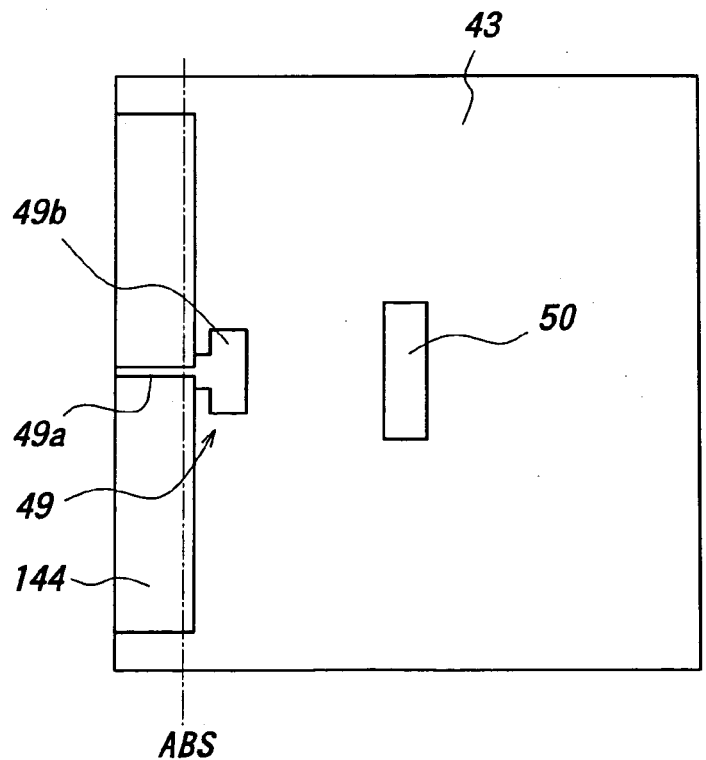

Next, the magnetic material film 46 made of FeN is selectively removed by RIE using the alumina insulating film 47 and hard mask 48 as an etching mask to form a top track pole 49 as shown in FIGS. 11A and 11B. At the same time, a top bridge portion 50 coupled with the bottom bridge portion 45 is formed. FIGS. 12A and 12B are perspective and plan views, respectively showing the top track pole 49, while the alumina insulating film 47 and hard mask 48 are dispensed with. The top track pole 49 includes a pole tip portion 49a having a narrow width of 0.1–0.3 µm and a contact portion 49b having a wide width, said contact portion being coupled with a top pole to be formed later. The pole tip portion 49a situates on the magnetic material film 144 constituting the bottom track pole, and the contact portion 49b situates on the alumina insulating film 43. That is to say, a throat height zero reference position $TH_0$ situates at a boundary between the pole tip portion 49a and the contact portion 49b. However, according to the invention, it is not always necessary to tack such a structure, and the throat height zero reference position $TH_0$ may be closer to the air bearing surface ABS with respect to the boundary between the track chip portion 49a and the contact portion 49b. In an actual manufacturing process of the thin film magnetic head, after forming a number of thin film magnetic head elements on the wafer in matrix, the wafer is divided into a plurality of bars, then a bar is polished to form air bearing surfaces, and finally the bar is divided into individual combination type thin film magnetic heads. Therefore, in a plan view of FIG. 12B, the pole tip portion 49a is drawn to have a long length and the air bearing surface ABS is denoted by a chain line.

According to the invention, it is very important to avoid etched debris from being attached to the pole tip portion 49a by performing the RIE under a $Cl_2$ gas, a mixture gas of $Cl_2$ and a chlorine series gas such as $BCl_2$ or a mixture gas of $Cl_2$ and $O_2$, Ar or $N_2$ at a high temperature of 50–300° C., particularly 200–300° C. By carrying out the RIE under a such condition, the magnetic material having a high saturation magnetic flux density such as FeN and FeCo can be etched efficiently and precisely. Moreover, the magnetic material film 46 is formed on the flat surface to have a flat surface, there is no protrusion and depression which might make a shadow for RIE, and a precise pattern can be formed. Since an etching rate of the magnetic material having a high saturation magnetic flux density such as FeN and FeCo under the above condition of RIE is higher than that of alumina, the magnetic material film 144 and alumina insulating film 43 are still remained as illustrated in FIG. 12.

Figure 14:
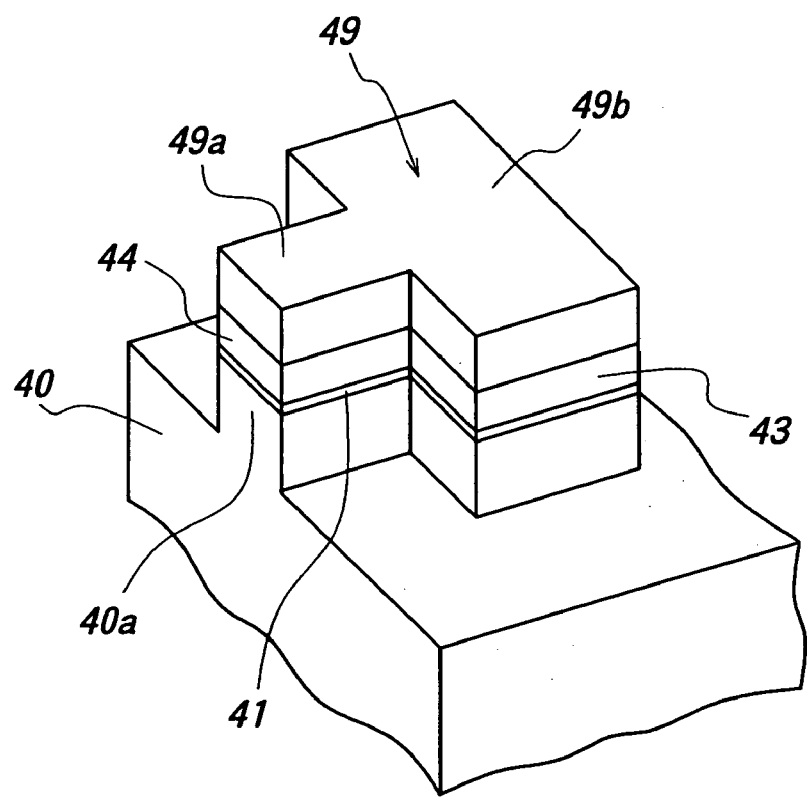
FIG. 14 is a perspective view showing the structure after forming a trim structure.

After forming the top track pole 49 in the manner explained above, the RIE is continued, while the alumina insulating film 47, hard mask 48 and top track pole 49 as an etching mask to remove the magnetic material film 144 selectively to form a bottom track pole 44. The track pole is constituted to have a double-layer structure of the bottom track pole 44 and top track pole 49 which are formed in a self-aligned manner. Therefore, it is possible to obtain the pole chip of submicron order in an accurate and stable manner. It should be noted that during this RIE process, the alumina insulating film 43 except for a portion under the track pole is selectively removed. Then, the RIE is continued to remove the write gap film 41 except for a portion under the track pole, and furthermore the bottom pole 40 is partially removed over a depth smaller than a thickness of the bottom pole to form a trim structure. This is shown in cross sectional views of FIGS. 13A and 13B as well as in a perspective view of FIG. 14, while the etching mask composed of the alumina insulating film 47 and hard mask 48 is removed. In the present embodiment, the trim structure is formed by removing the bottom pole 40 over a distance of 0.3–0.4 µm. According to the invention, the upper films including the write gap film 41 may be removed by RIE and then the bottom pole 40 may be partially removed by ion milling. By forming the trim structure only by RIE like as the present embodiment, it is possible to trim the bottom pole 40 accurately, and thus a widening of a magnetic flux at the air bearing surface ABS can be reduced and an undesired writing operation into adjacent tracks can be avoided. In this manner, the side-write can be effectively prevented. In the drawings, a portion of the bottom pole 40 whose width is shortened by the trimming is denoted by a bottom pole 40a.

Furthermore, when the trimming is performed by RIE as mentioned above, a trimming process time can be substantially shortened. In the ion milling, an etching rate of the magnetic material of the bottom pole 40 is about 300 Å/min, while in RIE, an etching rate is about 2000 Å/min. A width of the contact portion 49b of the top track pole 49 is suddenly widened at or near the throat height zero reference position $TH_0$, and therefore when the track chip portion 49a is formed by the ion milling like as the conventional method, a width of the track pole might be reduced toward its tip to have a tapered sides due to shadow portions. According to the invention, a width of the track pole can be uniform over its whole length, and therefore a track width at the air bearing surface ABS can be defined precisely and stably.

Next, an alumina insulating film 51 is formed on a whole surface with a thickness of 1.0–2.0 µm, and the alumina insulating film 47 and hard mask 48 are removed by CMP to obtain a flat surface which is coplanar with that of the top track pole 49 as shown in FIGS. 15A and 15B. In this case, a polishing amount of CMP is controlled such that the top track pole 49 has a thickness of 0.5–1.0 µm.

Then, on the surface flattened by CMP, is formed a first layer thin film coil 52 with a line width of 0.5 µm, a space width of 0.3 µm and a thickness of 1.0–1.5 µm. A photoresist insulating film 53 is formed by embedding the spaces of 0.3 µm of the thin film coil with photoresist and performing a heating treatment at a temperature of 200° C. as depicted in FIGS. 16A and 16B. At the same time, a contact portion 54 for connecting the thin film coil to an external circuit is formed.

Next, as illustrated in FIGS. 17A and 17B, an intermediate pole 55 for coupling the top track pole 49 with a top pole, an intermediate bridge portion 56 coupled with the upper bridge portion 50 constituting the back-gap, and a connecting portion 57 coupled with the contact portion 54 of the thin film coil 52 are formed with a thickness of 2.0–2.5 µm in accordance with a given pattern by plating of CoNiFe. Then, an alumina insulating film 58 is formed on a whole surface with a thickness of 3–4 µm, and after that a surface is flattened by CMP.

Next, a second layer thin film coil 61 is formed on the flattened surface with the same line/space and thickness as the first thin film coil 52. Then, spaces of the second layer thin film coil 61 are embedded with a photoresist insulating film 62 as shown in FIGS. 18A and 18B. During the formation of the second layer thin film coil 61, a connecting portion 63 is formed on the connecting portion 57 coupled with the contact portion 54 of the first layer thin film coil 52.

Furthermore, a top pole 64 made of CoNiFe is formed with a thickness of 2.5 µm by plating such that a front end of the top pole is brought into contact with the intermediate pole 55, and then an overcoat film 65 having a thickness of 20–40 µm is formed on a whole surface as illustrated in FIGS. 19A and 19B. In the present embodiment, the top pole 64 is made of CoNiFe, but according to the invention, the top pole 64 may be made of NiFe (80%:20%) or a plating film of NiFe (45%:55%) having a high saturation magnetic flux density. Moreover, the top pole 64 may be formed by a sputtering film of FeN or FeZrN. Furthermore, the top pole 64 may be formed by a multi-layer of inorganic insulating films and magnetic material films such as permalloy. In this case, a high frequency property can be further improved.

As depicted in FIG. 19A, a front end of the top pole 64 is retarded from the air bearing surface ABS and this retarding distance is preferably set to not less than 0.5 µm for preventing the side-write by a magnetic flux leaked out of the top pole. Furthermore, a side wall of the intermediate pole 55 is retarded from the air bearing surface ABS, and therefore only the bottom track pole 44 and top track pole 49 are exposed to the air bearing surface. This results in that the writing can be performed with a very small track width. Moreover, the track pole is constituted by the double-layer structure of the bottom track pole 44 and top track pole 49 which are formed precisely in a self-aligned manner, and thus the undesired erasing by the top track pole as well as the undesired exudation due to a spread of a magnetic flux can be effectively avoided.

Figure 20:
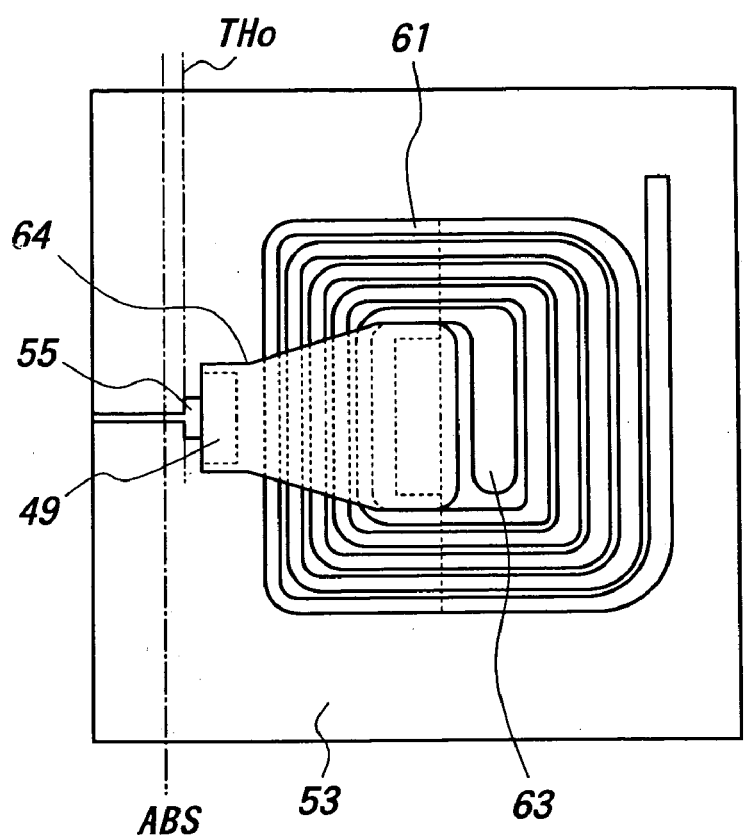
FIGS. 20 and 21 are plan and cross sectional views, respectively representing the structure after forming an top pole.

FIG. 20 is a plan view showing the structure after forming the top pole 64, while the photoresist insulating film 62 for supporting the second layer thin film coil 61 in an electrically isolated manner is deleted. An inner end of the thin film coil 61 is connected to the connecting portion 63 and an outer end is connected to an electrically conductive pattern not shown. The line/space of portions of the thin film coils 52 and 61 surrounded by a magnetic path constituted by the bottom pole 40, top pole 64, track poles and back-gap is smaller than that of remaining portions of the thin film coils.

Figure 21:
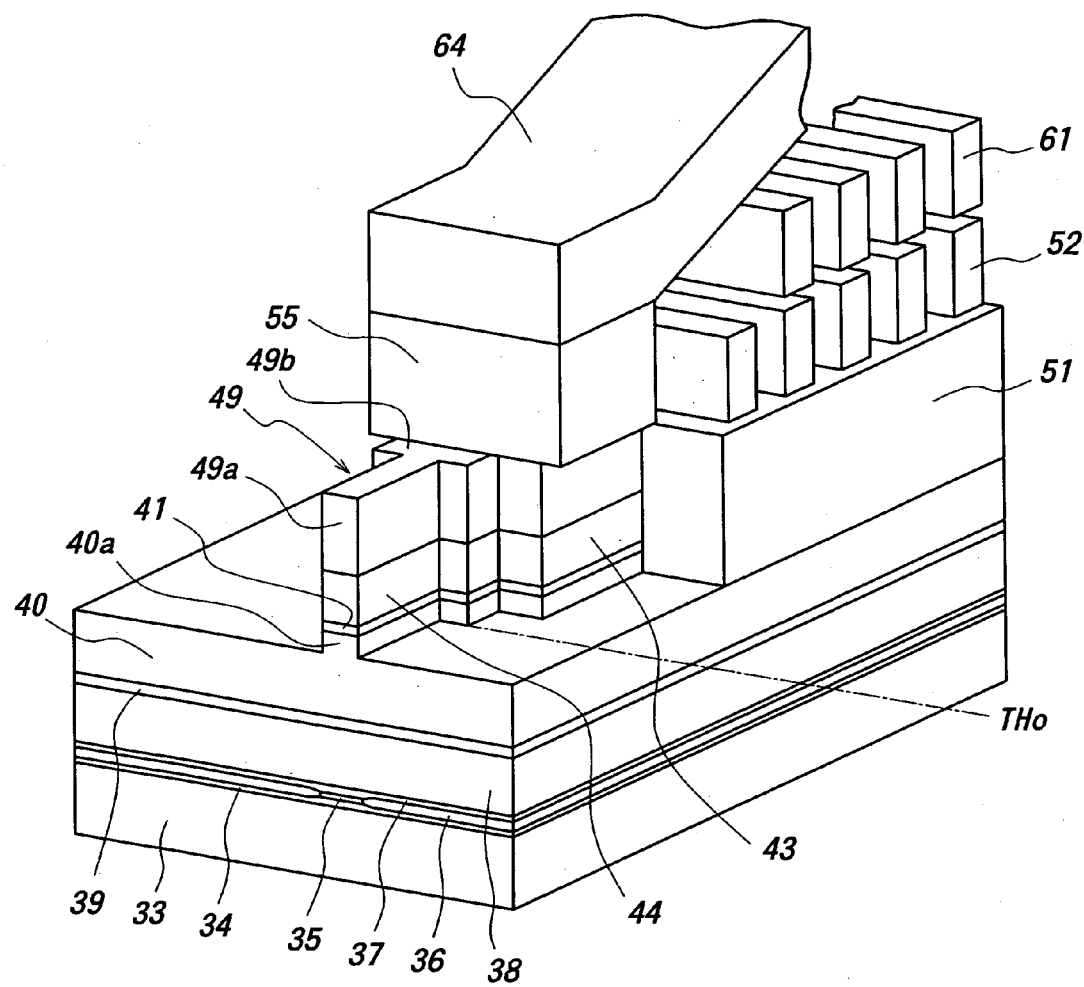

FIG. 21 is a perspective view showing a portion near the pole portion. For sake of clarity, a part of the alumina insulating film 51 is deleted. In the combination type thin film magnetic head according to the invention, the throat height zero reference position $TH_0$ is determined precisely by the outer end surface of the alumina insulating film 43 which is brought into contact with the end surface of bottom track pole 44 constituting a part of the track pole opposite to the air bearing surface ABS. Furthermore, the upper surfaces of the bottom track pole 44 and alumina insulating film 43 are formed to a coplanar flat surface, and the top track pole 49 formed on this flat surface and the bottom track pole 44 are formed in a self-aligned manner. Therefore, the pole chip portion 49a of the top track pole 49 having a very narrow width and the bottom track pole 44 can be formed accurately and stably. Moreover, the bottom track pole 44 and top track pole 49 are made of a magnetic material having a high saturation magnetic flux density such as FeN and FeCo and the contact portion 49b having a large surface area is coupled with the intermediate pole 55 at a large area. Therefore, the undesired saturation of the magnetic flux can be effectively prevented, and the over-write property and NLST characteristic can be improved.

Since the alumina insulating film 43 made of a non-magnetic material is provided under the contact portion 49b of the top track pole 49, an undesired leakage of a magnetic flux from the contact portion 49b to the bottom pole 40 can be prevented. Moreover, in the above mentioned embodiment, the bottom pole 40 is etched by RIE using the etching mask composed of the pole chip formed by the bottom track pole 44 and the pole chip portion 49a of the top track pole 49, and therefore the trim structure can be formed precisely. Furthermore, since the bottom pole 40 and the bottom and top track poles 44 and 49 are made of a magnetic material having a high saturation magnetic flux density not less than 2 T, a height of the whole track pole structure can be shortened, and therefore a high surface recording density can be attained without producing a spread of a magnetic flux during the writing operation. In the above embodiment, FeN is used as a magnetic material having a high saturation magnetic flux density forming the bottom pole 40 and the bottom and top track poles 44 and 49, but according to the invention, amorphous magnetic materials such as FeCo and FeCoZr may be used.

The first thin film coil 52 is formed on the flat surface defined by the top track pole 49 and alumina insulating films 53, 51 and the second thin film coil 61 is formed on the flat surface defined by the intermediate pole 55 and alumina insulating film 58, and thus these thin film coils can be miniaturized and a space width can be shortened substantially. In this manner, the magnetic path can be shortened.

Figure 22:
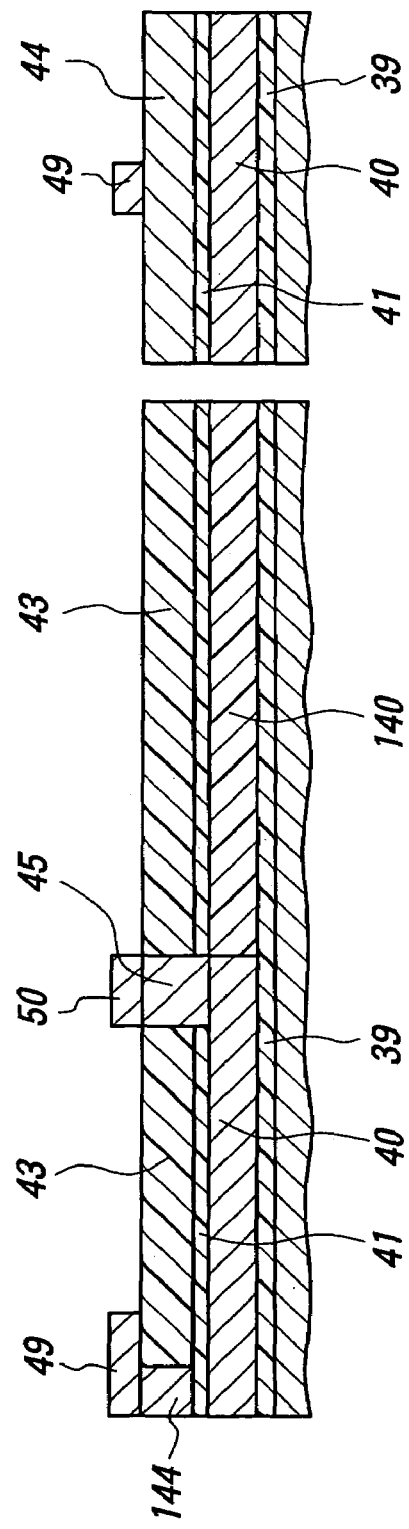
FIGS. 22A, 22B and 23A, 23B are cross sectional views showing a third successive steps of the method of manufacturing a second embodiment of the combination type thin film magnetic head according to the invention.

Now a second embodiment of the thin film magnetic head according to the present invention will be explained. In the second embodiment, portions similar to those of the first embodiment are denoted by the same reference numerals used in the first embodiment. The process shown in FIGS. 7–9 of the first embodiment are identical with those of the first embodiment. In the second embodiment, as shown in FIGS. 22A and 22B, on a flat surface of a magnetic material film 144 made of FeN or FeCo and constituting the bottom track pole and an alumina insulating film 43, a magnetic material film made of CoNiFe is formed with a thickness of 0.5–1.5 μm, and then this magnetic material film is shaped into a given pattern using a photoresist mask to form a top track pole 49. At the same time, an upper bridge portion 50 is formed.

Figure 23:
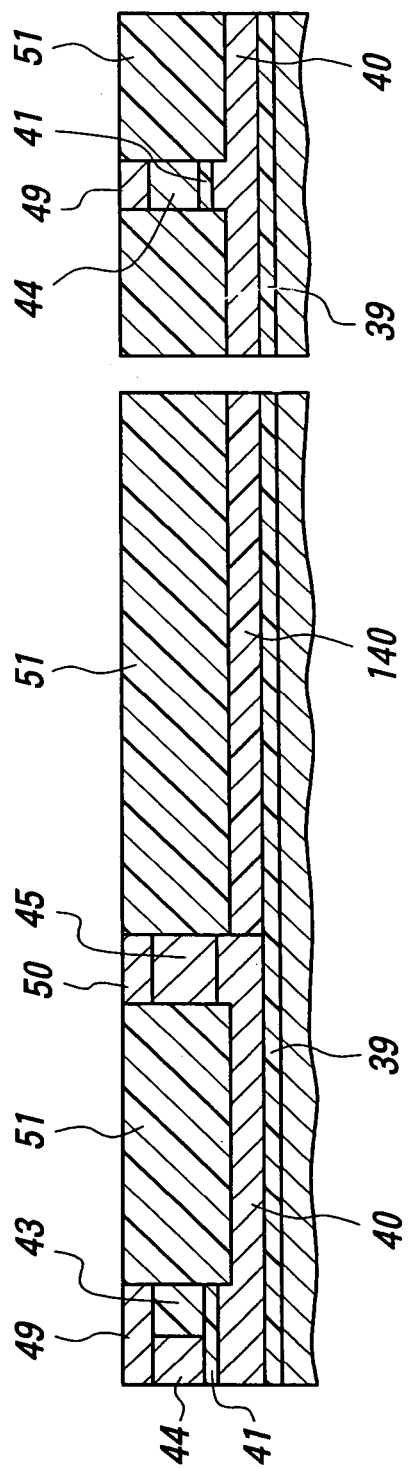

Next, RIE is carried out at a high temperature of 50–300° C. under a mixture gas of $O_2$ or $N_2$ or Ar and a chlorine series gas such as $BCl_2$ and $Cl_2$ to etch the magnetic material film 144 selectively into a desired pattern, while the top track pole 49 is used as an etching mask. Also in the present embodiment, the etching process is continued to remove a write gap film 41 under the alumina insulating film 43 and then the bottom pole 40 is etched over a part of its thickness to form the trim structure. After that, an alumina insulating film 51 is formed with a thickness of about 1–2 μm over a whole surface, and then CMP is performed such that the top track pole 49 has a thickness of 0.3–0.6 μm. In this manner, the bottom track pole 44 and top track pole 49 are formed in a self-aligned manner as shown in FIGS. 23A and 23B. Following steps are identical with the steps of the first embodiment illustrated in FIGS. 16–19.

Figure 24:
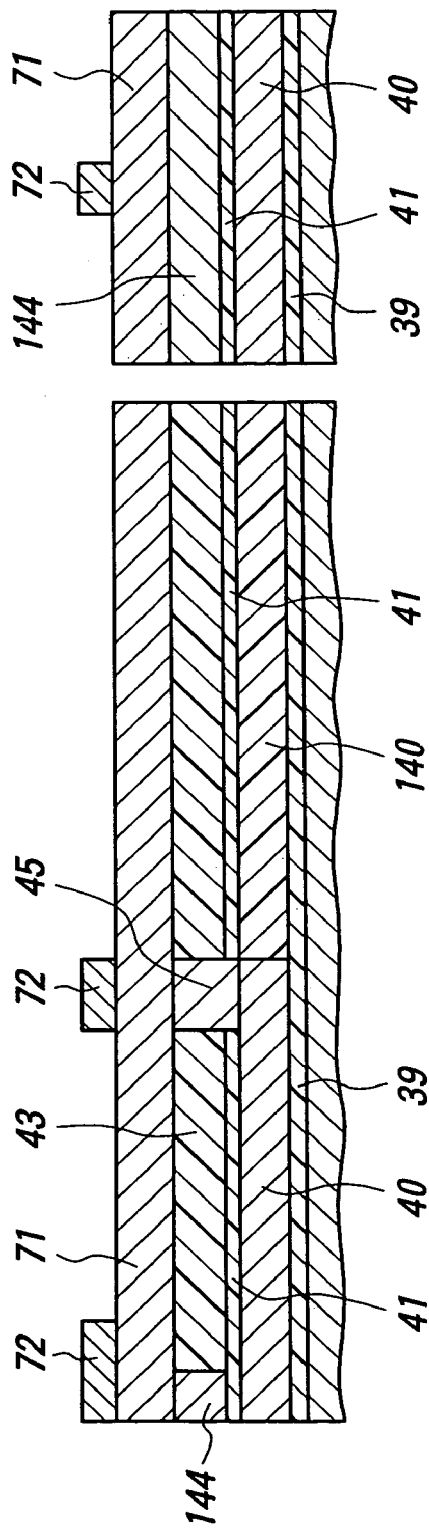
FIGS. 24A, 24B and 25A, 25B are cross sectional views depicting successive steps of the method of manufacturing a third embodiment of the combination type thin film magnetic head according to the invention.

Next a third embodiment of the present invention will be explained. In the third embodiment, portions similar to those of the first embodiment are denoted by the same reference numerals used in the first embodiment. Also in the third embodiment, the process shown in FIGS. 7–9 of the first embodiment are identical with those of the first embodiment. In the third embodiment, as depicted in FIGS. 24A and 24B, on a flat surface of a magnetic material film 144 made of a magnetic material having a high saturation magnetic flux density such as FeN and FeCo and constituting the bottom track pole and an alumina insulating film 43, a magnetic material film 71 made of a magnetic material having a high saturation magnetic flux density such as FeN and FeCo is formed by sputtering with a thickness of 1.0–1.5 μm. Then, a magnetic material mask 72 is formed by depositing a magnetic material film made of CoNiFe with a thickness of 1.5–2.5 μm by plating and then patterning this magnetic material film using a photoresist mask.

Figure 25:
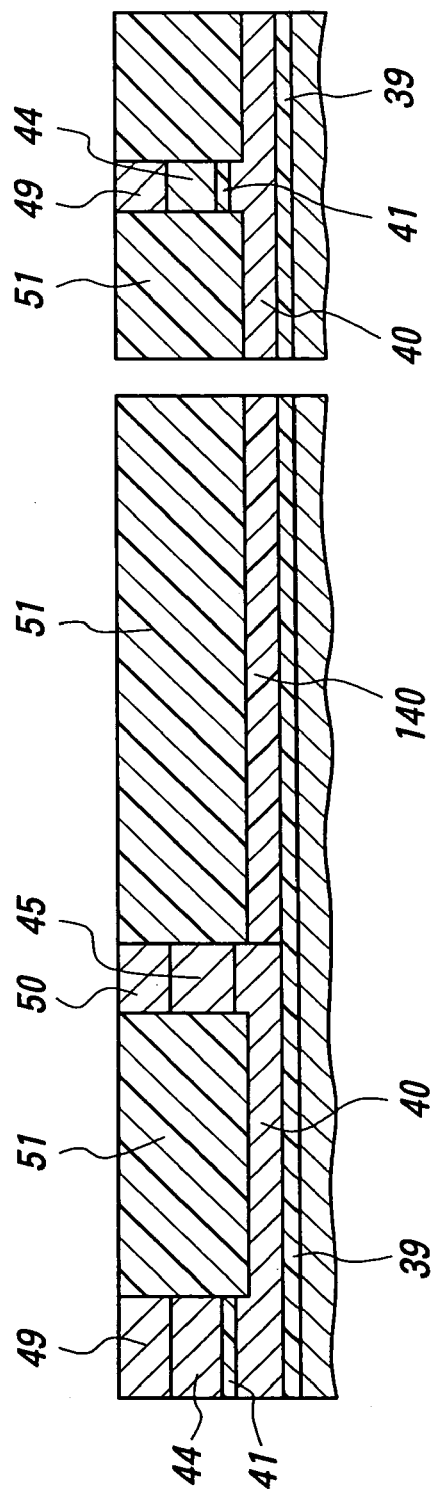

Then, RIE is carried out at a high temperature of 50–300° C., preferably 200–300° C. under a mixture gas of $O_2$ or $N_2$ or Ar and a chlorine series gas such as $BCl_2$ and $Cl_2$ to etch the magnetic material film 72 selectively into a desired pattern to form a top track pole 49, while the magnetic material film 72 is used as an etching mask. Further RIE is continued to etch the magnetic material film 144 into a given pattern to form a bottom track pole 44. At the same time, the lower bridge portion 50 is formed. Also in the present embodiment, the RIE process is continued to remove a write gap film 41 under the alumina insulating film 43 and then the bottom pole 40 is etched over a part of its thickness to form the trim structure. After that, an alumina insulating film 51 is formed with a thickness of about 1–2 μm over a whole surface, and then CMP is performed to remove the magnetic material mask 72. A polishing amount of CMP is controlled such that the top track pole 49 has a thickness of 0.3–0.6 μm. In this manner, the bottom and top track poles 44 and 49 as well as the trim structure of the bottom pole 40 are formed in a self-aligned manner as shown in FIGS. 25A and 25B. Following steps are identical with the steps of the first embodiment illustrated in FIGS. 16–19.

Figure 26:
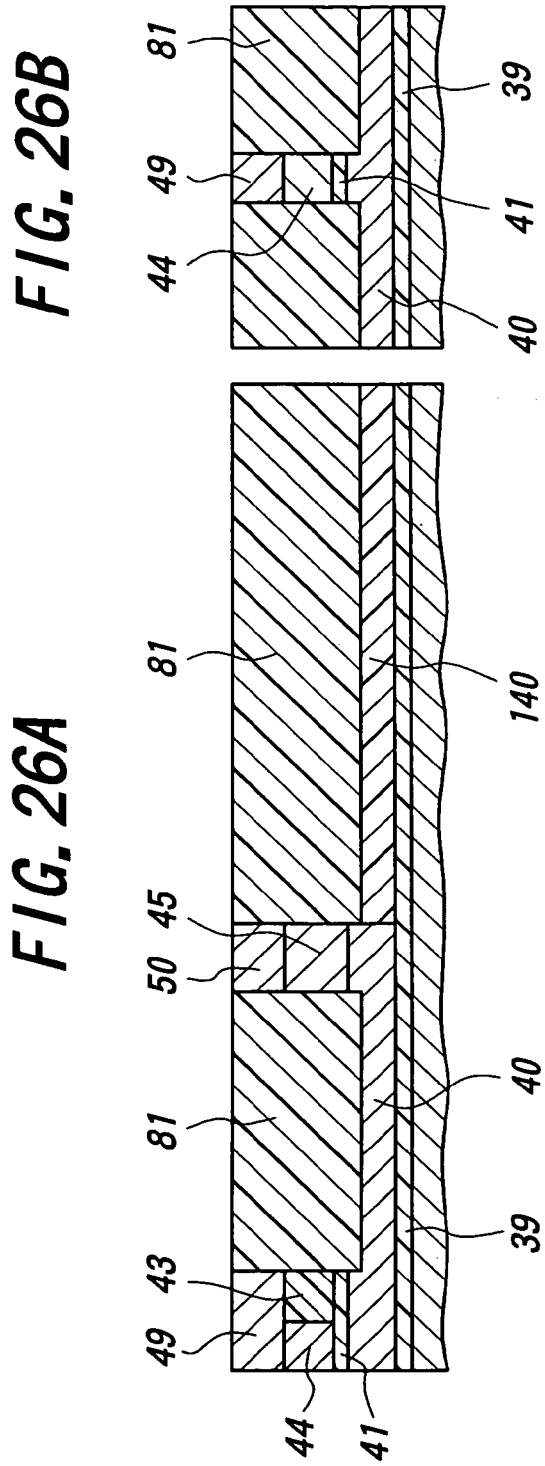
FIGS. 26A and 26B are cross sectional views illustrating successive steps of the method of manufacturing a fourth embodiment of the combination type thin film magnetic head according to the invention.

Next, a fourth embodiment of the thin film magnetic head according to the present invention will be explained. The fourth embodiment is a modification of the second embodiment. In the second embodiment, the magnetic material film made of CoNiFe is formed by plating on the flat surface of the alumina insulating film 43 and the magnetic material film 144 constituting the bottom track pole, and the top track pole 49 is formed by patterning this magnetic material film by means of the photoresist mask. In the fourth embodiment, a magnetic material film made of FeCo is formed by plating and this magnetic material film is selectively etched by means of a photoresist mask to form a top track pole 49. Then, RIE using the top track pole as an etching mask is carried out to remove selectively a magnetic material film 144 made of FeN or FeCo, and the RIE process is continued to remove the alumina insulating film 43 and write gap film 41. Furthermore, the RIE process is continued to remove partially a bottom pole 40 to form the trim structure. Then, after forming a photoresist film 81, a surface is flattened by etch-back as illustrated in FIGS. 26A and 26B. Upon compared with the second embodiment, the step of forming the alumina insulating film 51 after RIE and the step of flattening this alumina insulating film by CMP can be dispensed with, and therefore the manufacturing cost can be reduced.

Figure 27:
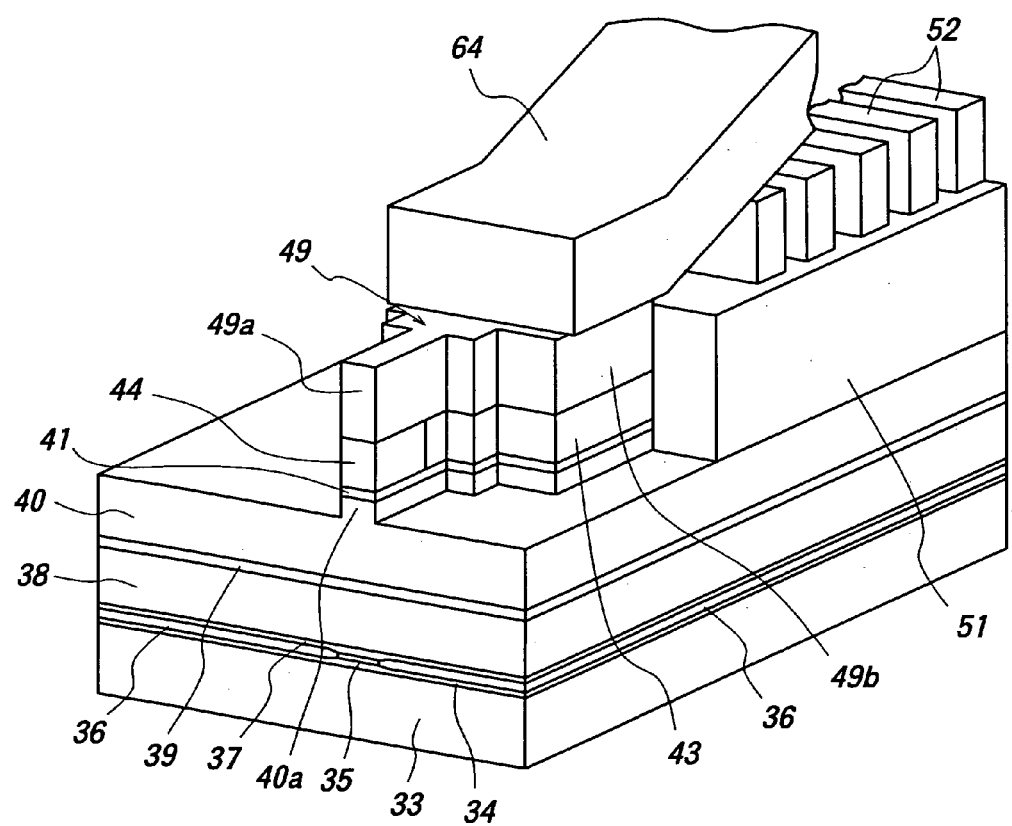
FIGS. 27 and 28 are perspective and cross sectional views showing successive steps of the method of manufacturing a fifth embodiment of the combination type thin film magnetic head according to the invention.
Figure 28:
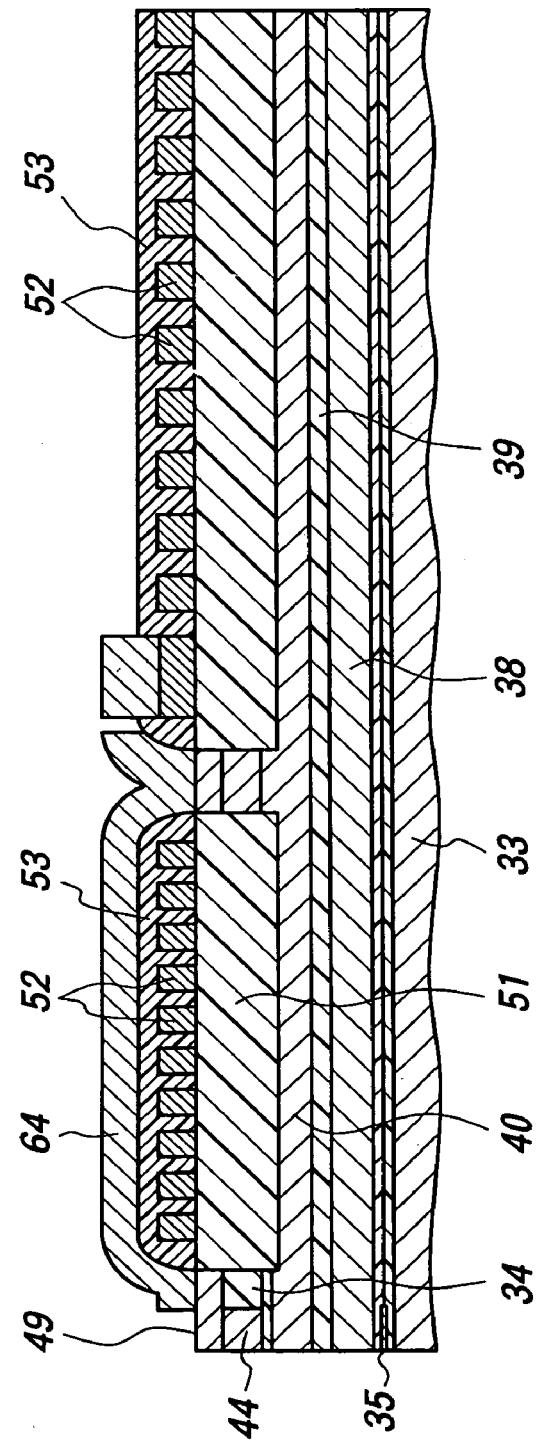

FIG. 27 is a perspective view showing a fifth embodiment of the combination type thin film magnetic head according to the invention, and FIG. 28 is a cross sectional view illustrating the construction prior to the formation of the overcoat film. In the first to fourth embodiments explained above, the thin film coil is formed as the double-layer structure. In the fifth embodiment, a single-layer thin film coil 52 is provided. Furthermore, in the fifth embodiment, the intermediate pole 55 provided between the contact portion 49b of the top track pole 49 and the top pole 64 is dispensed with. Moreover, in the present embodiment, since the top pole 64 is formed on the thin film coil 52, a photoresist insulating film 53 supporting the thin film coil in an electrically isolated manner is formed to cover completely the thin film coil.

Figure 29:
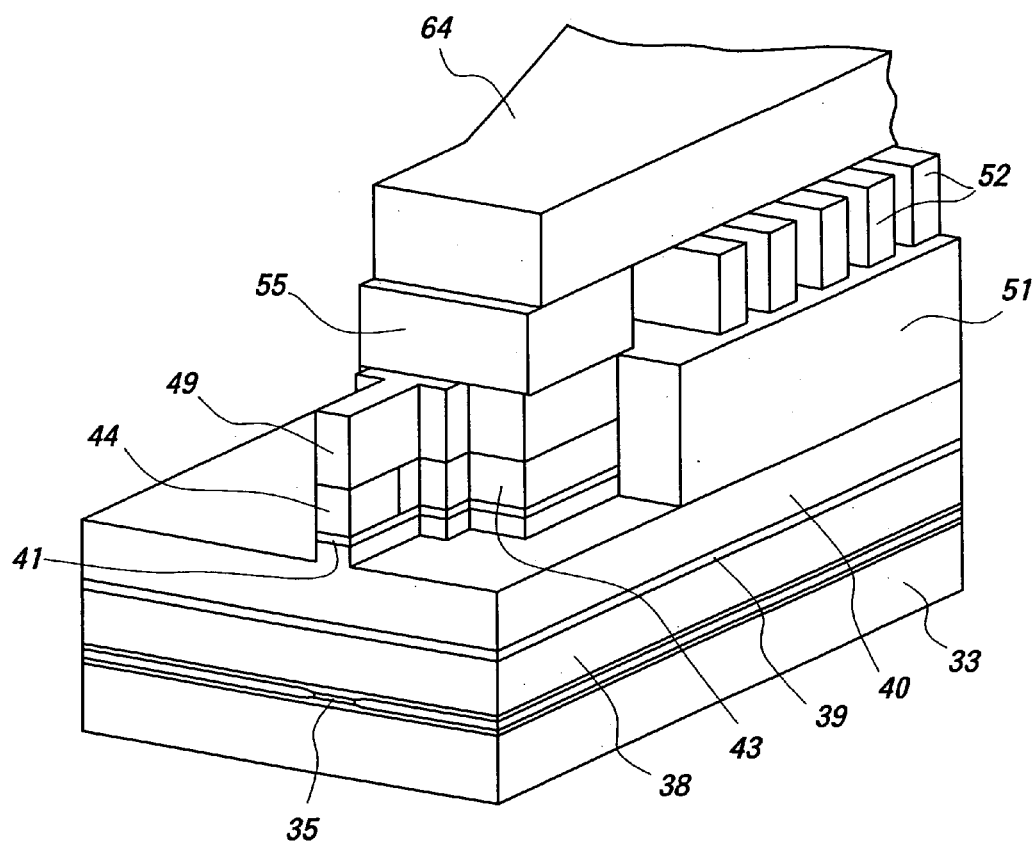
FIGS. 29 and 30 are perspective and cross sectional views, respectively representing successive steps of the method of manufacturing a sixth embodiment of the combination type thin film magnetic head according to the invention.
Figure 30:
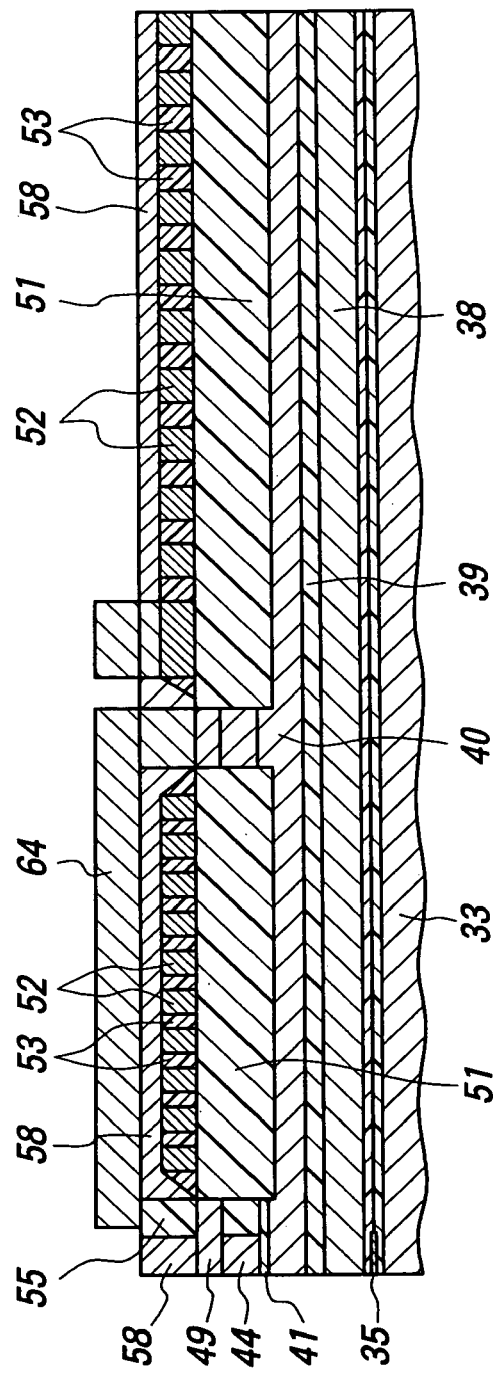

FIG. 29 is a perspective view depicting a sixth embodiment of the combination type thin film magnetic head according to the invention, and FIG. 30 is a cross sectional view illustrating the construction before forming the overcoat film. Like as the fifth embodiment, a single-layer thin film coil 52 is provided. However, in the sixth embodiment, an intermediate pole 55 is provided. That is to say, a bottom track pole 44 and a top track pole 49 are formed by RIE in a self-aligned manner, and RIE is continued to remove a write gap film 41 and to dig a surface of a bottom pole 40 over a distance of 0.3–0.4 μm to form the trim structure. Then, an alumina insulating film 51 is formed and its surface is flattened by CMP. After that, a thin film coil 52 and a photoresist insulating film 53 are formed on the flat surface, an intermediate pole 55 is formed. Then, an alumina insulating film 58 is formed and its surface is flattened by CUT to expose the intermediate pole 55. Therefore, the thin film coil 52 is formed completely within a height of the intermediate pole 55, and a top pole 64 can be formed on a flat surface to have a flat surface. This results in that the top pole 64 can be formed easily and accurately.

Next, a seventh embodiment of the combination type thin film magnetic head according to the present invention will be explained. The seventh embodiment is a modification of the first embodiment. In the first embodiment, as shown in FIG. 8, on the magnetic material film 42 made of FeN or FeCo having a high saturation magnetic flux density and constituting the bottom track pole, the mask 143 made of alumina, photoresist or metal is formed, and then RIE is performed at a high temperature of 50–300° C. under a chlorine gas series such as $BCl_2$ and $Cl_2$ to remove the magnetic material film 42 selectively. This RIE is continued until the write gap film 41 is exposed. In the seventh embodiment, as illustrated in FIGS. 31A and 31B, RIE is continued to remove the write gap film 41 and to remove the underlying bottom pole 40 over a distance of about 0.1–0.3 μm.

Figure 32A:
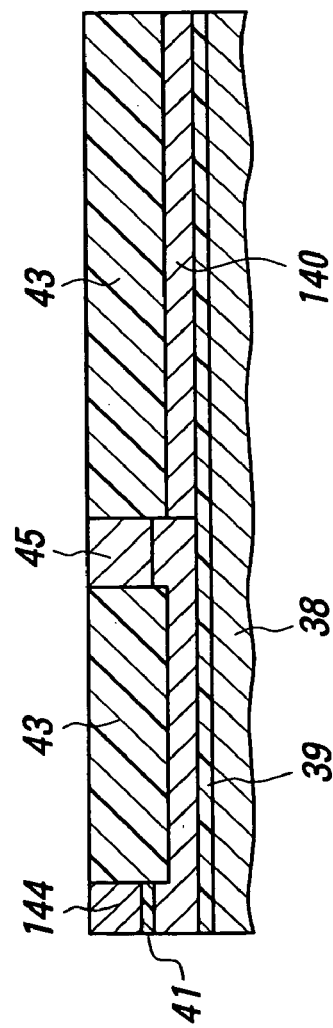
Figure 32B:
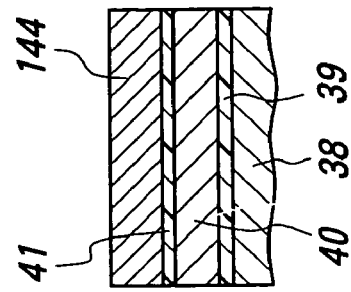

After that, an alumina insulating film 43 is formed with a thickness of about 1 μm on a whole surface, and the magnetic material film 42 and alumina insulating film 43 are polished by CMP, while a polishing amount of CMP is adjusted such that the magnetic material film 42 has a thickness of 0.2–0.4 μm. In this manner, a stripe-shaped magnetic material film 144 constituting a bottom track pole is formed as shown in FIGS. 32A and 32B. Also in the present embodiment, an outer end surface of the alumina insulating film 43 adjoining to an inner end surface of the magnetic material film 144 situates near a MR height zero position $MR_0$ of a GMR film 35 and defines a throat height zero reference position $TH_0$. Furthermore, during the formation of the magnetic material film 144 from the magnetic material film 42, a bottom bridge portion 45 constituting the back-gap is formed from the same magnetic material film 42 like as the first embodiment.

Figure 33:
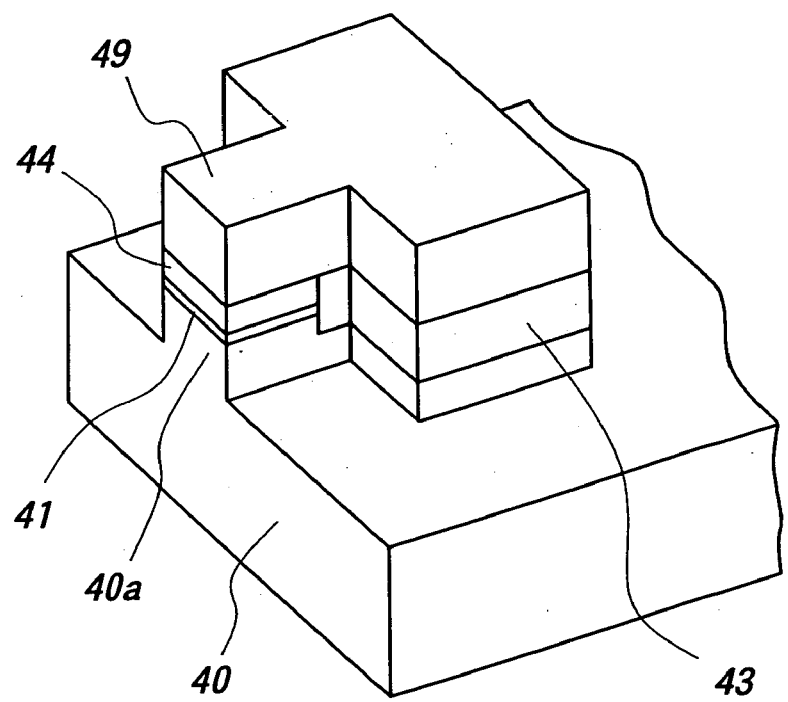
FIG. 33 is a perspective view illustrating the seventh embodiment of the combination type thin film magnetic head according to the invention.

FIG. 33 is a perspective view showing the condition of the seventh embodiment, in which the bottom track pole 44 and top track pole 49 are formed by RIE in a self-aligned manner, the RIE process is continued to remove the write gap film 41 and dig the bottom pole over a distance of 0.3–0.4 μm to form the trim structure. It should be noted that in the seventh embodiment, like as the fifth and sixth embodiments, the outer end surface of the alumina insulating film 43 defining the throat height zero reference position $TH_0$ is closer to the air bearing surface ABS with respect to the boundary between the narrow track chip portion 49a and the wide contact portion 49b of the top track pole 49. By adopting such a structure, it is possible to shorten the throat height much more.

In the above mentioned seventh embodiment, the RIE etching is carried out to remove the write gap film 41 and further remove the underlying bottom pole 40 selectively over a distance of about 0.1–0.2 μm. Therefore, a sufficiently long distance between the bottom pole 40 and the top track pole 49 can be attained even if a thickness of the bottom track pole 44 is reduced. When a thickness of the bottom track pole 44 is small, the track pole can be formed by RIE much more easily, and the track pole having a miniaturized construction can be manufactured much more accurately and easily. It should be noted that such a construction may be also applied in the second to sixth embodiments, but its explanation is dispensed with.

Now an eighth embodiment of the combination type thin film magnetic head according to the invention will be explained. In the first embodiment, after forming the alumina insulating film 47 and hard mask 48 on the magnetic material film 46 constituting the top track pole 49, RIE is performed to form the top track pole 49 and to etch the magnetic material film 144 and alumina insulating film 43 to form the bottom track pole 44 in a self-aligned manner, and RIE is continued to remove the write gap film 41 and to remove the underlying bottom pole 40 to reduce its thickness to form the trim structure in a self-aligned manner. After that, the alumina insulating film 51 is formed such that aligned side walls of the bottom track pole 44, top track pole 49 and alumina insulating film 43 are covered with the alumina insulating film 51. In the eighth embodiment, upon forming the track pole as well as the trim structure by RIE, the pole chip portion 49a of the top track pole 49 is formed to have a wider width such as 0.2 μm than a desired width to be obtained finally. Then, an ion milling is performed to the side wall of the pole chip portion at an angle of 40–70° to reduce a width of the track pole and the trim structure of the bottom pole 40 to 0.1 μm. As compared with the known method in which the etching is performed only by the ion milling, the etching process can be shortened materially. Moreover, since the mask including the alumina insulating film 47 and hard mask 48 which are hardly etched by the ion milling are formed on the surface, a thickness of the top track pole 49 is not reduced. Furthermore, even if residual debris might be adhered during RIE, it can be removed by the ion milling, and thus an undesired corrosion of the track pole due to $Cl_2$ contained in the debris can be effectively avoided.

Next a ninth embodiment of the combination type thin film magnetic head according to the invention will be explained. In the first embodiment, after forming the top track pole 49, RILE is performed while the top track pole is used as the etching mask to etch the magnetic material film 144 and alumina insulating film 43 to form the bottom track pole 44, and RIE is continued to remove the write gap film 41 and to remove the underlying bottom pole 40 over a part of its thickness to form the trim structure. In the ninth embodiment, upon forming the track pole as well as the trim structure by RIE, the pole chip portion 49a of the top track pole 49 is formed to have a wider width such as 0.2 μm than a desired width to be obtained finally. Then, an ion milling is performed to the side wall of the pole chip portion at an angle of 40–70° to reduce a width of the track pole and the trim structure of the bottom pole 40 to 0.1 μm or less. As compared with the known method in which the etching is performed only by the ion milling, the etching process can be shortened materially, and thus a thickness of the top track pole 49 is not reduced. In the known method in which the trim structure is formed by the ion milling by means of a mask formed by the track pole made of a magnetic material, since a reduction of thickness of the track pole, the track pole has to be formed with a larger thickness. Then, the track pole could not be formed in a miniaturized shape. In the ninth embodiment, the ion milling process time is very short, a reduction of the top track pole 49 is hardly observed.

In the combination type thin film magnetic head and the method of manufacturing the same according to the invention, it is possible to attain the following various advantages. At first, the pole chip portion has the double-layer structure consisting of the bottom track pole 44 and top track pole 49 formed by etching the magnetic material films each of which is formed on a flat surface to have a uniform thickness. Therefore, the bottom and top track poles can be formed precisely into given patterns. Furthermore, since the bottom track pole 44 and top track pole 49 are formed in a self-aligned manner, the miniaturized track chip having a width of 0.1–0.3 µm can be obtained accurately and stably. Moreover, the bottom track pole 44 and top track pole 49 are made of a magnetic material having a high saturation magnetic flux density such as FeN and FeCo, and thus a magnetic flux generated by the thin film coil can be effectively flows into the miniaturized track pole without saturation. In this manner, it is possible to attain the inductive type thin film magnetic head having a high efficiency and no magnetic flux loss.

Furthermore, in the embodiment in which the bottom track pole 44 and top track pole 49 are formed by RIE using the plating film of CoFeNi as an etching mask, the track pole having a desired thickness can be formed precisely, because an etching rate of the plating film of CoFeNi is smaller than that of FeN or FeCo film by two to three times and the CoFeNi mask is optimum for RIE. Moreover, since the plating film of CoFeNi has a higher hardness than FeN or FeCo film, if the track pole is formed only from the CoFeNi plating film having a larger thickness, the plating film night be peeled off due to an internal stress. According to the present invention, the track pole is consisting of the double-layer structure of the bottom track pole 44 and top track pole 49, when the CoFeNi plating film is used as the top track pole, a thickness of the plating film can be smaller, and therefore the plating film is hardly peeled off.

If the narrow track pole having a width of 0.1–0.2 µm is formed only from the CoFeNi plating film, control of thee compositions is difficult and a mass production could not be realized due to various problems such as over-write. According to the present invention, since the track pole has the double-layer or stitch structure, even if composition and thickness of the top track pole formed by the CoFeNi plating film are varied slightly, the underlying bottom track pole 44 can be formed precisely, and no problem occurs. In this manner, according to the invention, it is possible to provide the inductive type thin film magnetic head having the improved property without undesired saturation and leakage of magnetic flux.

According to the present invention, the track chip may be made of a magnetic material having a high saturation magnetic flux density, a height (thickness) of the track chip can be small. Particularly, a thickness of the top track pole 49 can be small owing to the double-layer structure. This results in that a thickness of a frame pattern of a photoresist defining a shape of the top track pole can be small, and therefore a focus of the photolithography can be sharp and a photoresist having a high sensitivity can be utilized. Therefore, a high resolution photolithography can be realized and the track chip having a very fine structure can be formed accurately.

Moreover, the top track pole 49 is consisting of the track chip portion 49a having a very narrow width and the contact portion 49b having a wide width which are formed continuously as an integral unit. If the trim structure is formed by selectively etching the bottom pole by the ion milling in the known manufacturing method, there is a shadow for the ion milling at a corner at which a width is changed abruptly, it is no more possible to perform an accurate etching. In the present invention, since the RIE process is used, the bottom pole 40 can be accurately etched even at a corner of the top track pole.

When the trim structure is formed by selectively etching the bottom pole by the ion milling in the known manufacturing method, a width of the track chip might be thin by an amount of about 0.1 µm. Particularly, when the top track pole contains an abruptly changing corner as mentioned above, a width of the trim structure might be thin from a root portion toward a tip potion. A polishing amount for forming the air bearing surface is determined by the MR height of the GMR element, and the air bearing surface is not always formed at a same throat height position. Therefore, if a width of the track chip becomes thin toward its tip portion, a width of the track chip exposed on the air bearing surface. According to the present invention, since the track chip can be formed to have a uniform width over its whole length, even if a position of the air bearing surface is changed, a width of the track chip on the air bearing surface can be always maintained constant.

Furthermore, according to the invention, the thin film coil 52, 61 can be precisely formed on a flat surface having no depression and protrusion, it is possible to shorten materially a space between successive coil windings. This results in that a magnetic path of the thin film coil can be shortened, and a high frequency property can be improved.

The present invention is not limited to the embodiments explained above, but many alternations and modifications can be conceived by a person skilled in the art within the scope of the invention defined by claims. For instance, in the above explained embodiments, the magnetoresistive type thin film magnetic head element is provided on the substrate and then the inductive type thin film magnetic head element is stacked thereon, but according to the invention, a stacking order of these thin film magnetic head elements may be reversed to form a reversed type magnetic head. Moreover, in the above embodiments, the magnetoresistive type thin film magnetic head element is formed by the GMR element, but it may be formed by the MR element. Furthermore, in the above mentioned embodiments, after forming the track chip by means of RIE, the trim structure is formed by further etching the write gap film and bottom pole. However, according to the invention, it is not always necessary to form such a trim structure.

The invention claimed is:

1. A method of manufacturing a combination type thin film magnetic head including a substrate, an inductive type thin film magnetic head element and a magnetoresistive type thin film magnetic head element which are supported by the substrate to define an air bearing surface, wherein a process of forming said inductive type thin film magnetic head element comprises:

a step of forming a first pole made of a magnetic material;
a step of forming a write gap film made of a non-magnetic material on one surface of said first pole;

a step of forming a first magnetic material film on a surface of said write gap film;

a first etching step for removing said first magnetic material film such that a portion of the first magnetic material film extending from at least a position which will define an air bearing surface to a throat height zero reference position;

a step of forming a first non-magnetic material film such that the first non-magnetic material film is brought into contact with said first magnetic material film at said throat height zero reference position;

a step of polishing said first non-magnetic material film to form a flat surface which is coplanar with a surface of said first magnetic material film opposite to a surface which is brought into contact with said write gap film;

a step of forming, on said flat coplanar surfaces of the first magnetic material film and first non-magnetic material film, an top track poles made of a magnetic material such that the top track pole includes a track chip portion which extends inwardly from at least said position for defining the air bearing surface to at least an inner end surface of said first non-magnetic material film and a contact portion which continues from said track chip portion and has a wider width than said track chip portion;

a second etching step for selectively removing said first non-magnetic material film and first magnetic material film to form a bottom track pole by a reactive ion etching, while said top track pole is used as a mask;

a step of forming a second non-magnetic material film in an area which is removed by said second etching step;

a step of polishing said second non-magnetic material film to obtain a flat surface which is coplanar with the surface of said top track pole;

a step of forming a thin film coil in an inner area with respect to adjoining end surfaces of the first and second non-magnetic material films such that the thin film coil is isolated electrically; and a step of forming a second pole made of a magnetic material such that one end of the second pole is magnetically coupled with said contact portion of the top track pole and the other end is magnetically coupled with said first pole at a back-gap remote from the air bearing surface.

2. The method of manufacturing a combination type thin film magnetic head according to claim 1, wherein during said second etching step, the reactive ion etching is continued after forming the bottom track pole to remove said write gap film selectively and to remove said first pole over a distance smaller than a thickness of the first pole to form a trim structure.

3. The method of manufacturing a combination type thin film magnetic head according to claim 2, wherein said during said first etching step, said first non-magnetic material film is removed up to the surface of the write gap film.

4. The method of manufacturing a combination type thin film magnetic head according to claim 2, wherein during said first etching step, said first non-magnetic material film is removed beyond the surface of the write gap film.

5. The method of manufacturing a combination type thin film magnetic head according to claim 2, wherein said step of forming the top track pole includes a step of forming a flat second magnetic material film on the flat coplanar surface of said first magnetic material film and first non-magnetic material film, a step of forming a mask having a given pattern corresponding to a shape of the top track pole to be formed on said second magnetic material film, and a step of selectively removing said second magnetic material film by the reactive ion etching using said mask, wherein the bottom track pole is formed in a self-aligned manner by continuing the reactive ion etching to partially remove said first magnetic material film.

6. The method of manufacturing a combination type thin film magnetic head according to claim 5, wherein said first magnetic material film is made of FeN or FeCo, said second magnetic material film is formed by a plating film of FeN or FeCo, and said reactive ion etching for selectively removing the first and second magnetic material films is performed at an etching temperature of 50–300° C. under an atmosphere of a $Cl_2$ gas or a mixed gas of $Cl_2$ and a boron series gas such as $BCl_2$ with at least one additive of $O_2$, Ar and $N_2$.

7. The method of manufacturing a combination type thin film magnetic head according to claim 6, wherein said reactive ion etching for etching said second magnetic material film is performed at an etching temperature of 200–300° C.

8. The method of manufacturing a combination type thin film magnetic head according to claim 2, wherein said step of forming the top track pole includes a step of forming a flat second magnetic material film on the flat coplanar surface of said first magnetic material film and first non-magnetic material film, and a step of forming the top track pole using a mask formed on said second magnetic material film to have a given pattern corresponding to a shape of the top track pole to be formed, wherein the bottom track pole is formed in a self-aligned manner by performing a reactive ion etching to etch said first magnetic material film, while said top track pole is used as an etching mask.

9. The method of manufacturing a combination type thin film magnetic head according to claim 8, wherein said first magnetic material film is made of FeN or FeCo, said second magnetic material film is formed by a plating film of FeN or FeCo, and said reactive ion etching for etching the first magnetic material film while said top track pole is used as the etching mask is performed at an etching temperature of 50–300° C. under an atmosphere of a $Cl_2$ gas or a mixed gas of $Cl_2$ and a boron series gas such as $BCl_2$ with at least one additive of $O_2$, Ar and $N_2$.

10. The method of manufacturing a combination type thin film magnetic head according to claim 9, wherein said reactive ion etching for etching said first magnetic material film is performed at an etching temperature of 200–300° C.

11. The method of manufacturing a combination type thin film magnetic head according to claim 8, wherein said first magnetic material film is made of FeN or FeCo, said second magnetic material film is formed by a sputtering film of FeN or FeCo, the top track pole is formed using a mask formed by a plating film of CoFeNi formed on the second magnetic material film, and said reactive ion etching for etching the first magnetic material film to form the bottom track pole is performed at an etching temperature of 50–300° C. under an atmosphere of a $Cl_2$ gas or a mixed gas of $Cl_2$ and a boron series gas such as $BCl_2$ with at least one additive of $O_2$, Ar and $N_2$.

12. The method of manufacturing a combination type thin film magnetic head according to claim 11, wherein said reactive ion etching for etching said first magnetic material film is performed at an etching temperature of 200–300° C.

13. The method of manufacturing a combination type thin film magnetic head according to claim 8, wherein said first magnetic material film is made of FeN or FeCo, said second magnetic material film is formed by a plating film of CoNiFe or FeCo, the top track pole is formed by etching the second magnetic material film in accordance with a given pattern, and said reactive ion etching for forming the bottom track pole by etching the first magnetic material film while said top track pole is used as an etching mask is performed at an etching temperature of 50–300° C. under an atmosphere of a $Cl_2$ gas or a mixed gas of $Cl_2$ and a boron series gas such as $BCl_2$ with at least one additive of $O_2$, Ar and $N_2$.

14. The method of manufacturing a combination type thin film magnetic head according to claim 13, wherein said reactive ion etching for etching said first magnetic material film is performed at an etching temperature of 200–300° C.

15. The method of manufacturing a combination type thin film magnetic head according to claim 2, wherein said thin film coil is formed on said flat coplanar surface of said top track pole and second non-magnetic material film.

16. The method of manufacturing a combination type thin film magnetic head according to claim 15, wherein after forming said thin film coil on the flat coplanar surface of said top track pole and second non-magnetic material film, a third non-magnetic material film is formed to cover said thin film coil, an intermediate pole made of a magnetic material is formed such that one end of the intermediate pole is brought into contact with the surface of said top track pole and the other end of the intermediate pole is coplanar with a surface of said third non-magnetic material film, and said second pole is formed on the flat coplanar surface of said intermediate pole and third non-magnetic material film.

17. The method of manufacturing a combination type thin film magnetic head according to claim 2, wherein after forming a first layer thin film coil on the flat coplanar surface of said top track pole and second non-magnetic material film, a third non-magnetic material film is formed to cover said first layer thin film coil, an intermediate pole made of a magnetic material is formed such that one end of the intermediate pole is brought into contact with the surface of said top track pole and the other end of the intermediate pole is coplanar with a surface of said third non-magnetic material film, and a second layer thin film coil is formed on the flat coplanar surface of said intermediate pole and third non-magnetic material film.

18. The method of manufacturing a combination type thin film magnetic head according to claim 2, wherein said first and second non-magnetic material films are made of alumina.

19. The method of manufacturing a combination type thin film magnetic head according to claim 2, wherein during said second etching step with the reactive ion etching, after forming the bottom track pole, removing said write gap film selectively and removing said first pole over a part of a thickness thereof to form the trim structure, an ion milling is performed for side walls of the top track pole, bottom track pole and first pole constituting the trim structure to thin a width.

20. The method of manufacturing a combination type thin film magnetic head according to claim 19, wherein said ion milling is performed at an angle of 40–70° with respect to the side walls whose width has to be thin.

21. The method of manufacturing a combination type thin film magnetic head according to claim 2, wherein after forming said magnetoresistive type thin film magnetic head element on the substrate, said inductive type thin film magnetic head element is formed on the magnetoresistive type thin film magnetic head element.

22. The method of manufacturing a combination type thin film magnetic head according to claim 2, wherein said magnetoresistive type thin film magnetichead element is formed as a GMR head element.

* * * * *